United States Patent
Matsui et al.

(10) Patent No.: US 12,516,862 B2
(45) Date of Patent: Jan. 6, 2026

(54) STORAGE UNIT HAVING MOVABLE TEMPERATURE ADJUSTMENT DEVICE

(71) Applicant: DAIKIN INDUSTRIES, LTD., Osaka (JP)

(72) Inventors: Hidenori Matsui, Osaka (JP); Kiichiro Sato, Osaka (JP); Toshiaki Mukaidani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 154 days.

(21) Appl. No.: 18/552,517

(22) PCT Filed: Mar. 30, 2022

(86) PCT No.: PCT/JP2022/015917
§ 371 (c)(1),
(2) Date: Sep. 26, 2023

(87) PCT Pub. No.: WO2022/210862
PCT Pub. Date: Oct. 6, 2022

(65) Prior Publication Data
US 2024/0167751 A1 May 23, 2024

(30) Foreign Application Priority Data
Mar. 31, 2021 (JP) .................................. 2021-059437

(51) Int. Cl.
*F25D 17/00* (2006.01)
*F25D 11/00* (2006.01)
(Continued)

(52) U.S. Cl.
CPC ............ *F25D 17/06* (2013.01); *F25D 11/003* (2013.01); *F25D 23/069* (2013.01)

(58) Field of Classification Search
CPC ...... B60P 3/205; F25D 11/003; F25D 23/069; F25D 17/06
See application file for complete search history.

(56) References Cited

U.S. PATENT DOCUMENTS

| 2,540,956 A | 2/1951 | Morrison |
| 2,973,186 A * | 2/1961 | Hazard ................ G05D 23/023 |
| | | 165/104.34 |

(Continued)

FOREIGN PATENT DOCUMENTS

| CN | 203824202 U | 9/2014 |
| CN | 209444100 U | 9/2019 |

(Continued)

OTHER PUBLICATIONS

International Preliminary Report on Patentability for PCT/JP2022/015917 mailed on Oct. 12, 2023.

(Continued)

*Primary Examiner* — Eric S Ruppert
(74) *Attorney, Agent, or Firm* — IPUSA, PLLC

(57) ABSTRACT

A storage includes: a storage chamber that stores goods; a partition configured to move back and forth in a direction along an inner wall of the storage chamber, and divide the storage chamber into multiple rooms; and a temperature adjustment device configured to move back and forth in the direction along the inner wall of the storage chamber, and adjust the multiple rooms to different temperatures. For example, in conjunction with the movement of the partition, the temperature adjustment device moves in the above direction. The partition is configured to move back and forth between a first position, at which the partition is stored along the inner wall, and a second position, at which the partition divides the storage chamber into the multiple rooms, and the temperature adjustment device moves in that direction in (Continued)

conjunction with the movement of the partition between the first position and the second position.

8 Claims, 46 Drawing Sheets

(51) Int. Cl.
*F25D 17/06* (2006.01)
*F25D 23/06* (2006.01)

(56) References Cited

U.S. PATENT DOCUMENTS

| | | | | |
|---|---|---|---|---|
| 4,961,454 | A * | 10/1990 | Reilly, Jr. | ............... E06B 3/481 |
| | | | | 160/199 |
| 2008/0011013 | A1* | 1/2008 | Junge | ................... F25D 17/065 |
| | | | | 62/443 |
| 2016/0348955 | A1* | 12/2016 | Ren | ...................... F25D 17/065 |
| 2020/0071076 | A1 | 3/2020 | Fosnight et al. | |

FOREIGN PATENT DOCUMENTS

| | | | |
|---|---|---|---|
| CN | 210858433 U | 6/2020 | |
| EP | 0903252 | 3/1999 | |
| EP | 1378392 | 2/2009 | |
| EP | 3243699 A1 * | 11/2017 | ......... B60H 1/00014 |
| EP | 3537068 A1 * | 9/2019 | ......... B60H 1/00014 |
| JP | S57-145986 U | 9/1982 | |
| JP | S60-44841 U | 3/1985 | |
| JP | H05-17469 U | 3/1993 | |
| JP | 2001-221566 | 8/2001 | |
| JP | 2007-106144 | 4/2007 | |

OTHER PUBLICATIONS

International Search Report for PCT/JP2022/015917 mailed on Jun. 21, 2022.
Extended European search report mailed on Mar. 19, 2025 with respect to the corresponding European patent application No. 22781072.8.

* cited by examiner

STORAGE UNIT HAVING MOVABLE TEMPERATURE ADJUSTMENT DEVICE

TECHNICAL FIELD

The present disclosure relates to a storage.

BACKGROUND ART

There is a compartmentalization device that is installed in a refrigerator car or a heat-retaining car, and partitions the compartment into two or more rooms by partition walls (see, for example, patent document 1).

RELATED-ART DOCUMENT

Patent Document

Patent Document 1: Unexamined Japanese Patent Application Publication No. 2007-106144

SUMMARY OF THE INVENTION

Problem to be Solved by the Invention

However, with conventional techniques, it is difficult to create environments with different temperatures per divided room.

The present disclosure provides a storage whereby environments with different temperatures can be created per divided room.

Means for Solving the Problem

The present disclosure provides a storage. This storage includes: a storage chamber that stores goods; a partition configured to move back and forth in a direction along an inner wall of the storage chamber, and divide the storage chamber into a plurality of rooms; and a temperature adjustment device configured to move back and forth in the direction along the inner wall of the storage chamber, and adjust the plurality of rooms to different temperatures.

By this means, it is possible to create environments with different temperatures per divided room.

In the storage above, the temperature adjustment device may move in the direction in conjunction with the movement of the partition.

By this means, the temperature adjustment device can be moved with ease, in conjunction with the movement of the partition.

In the storage above, the partition may be configured to move back and forth between a first position, at which the partition is stored along the inner wall, and a second position, at which the partition divides the storage chamber into the plurality of rooms, and the temperature adjustment device may move in the direction in conjunction with the movement of the partition between the first position and the second position.

By this means, the temperature adjustment device can be moved with ease, in conjunction with the movement of the partition, between the first position and the second position.

In the storage above, the partition may have a partition surface in which a plurality of slats are connected in an accordion-like manner, and the partition surface may be positioned along the inner wall when the partition is stored along the inner wall, and positioned to face the direction when the partition divides the storage chamber into the plurality of rooms.

By this means, the partition is less likely to be cumbersome when it is stored, and the storage chamber can be divided into multiple rooms in the above direction.

In the storage above, the temperature adjustment device may span the plurality of rooms when the partition divides the storage chamber into the plurality of rooms.

By this means, it is possible to create environments with different temperatures per room divided by the partition.

In the storage above, the temperature adjustment device may be further configured to move back and forth up to an outer door that separates an inside and an outside of the storage.

By this means, it becomes easy to access the temperature adjustment device from outside the storage, through the outer door, so that, for example, work such as replacement or repair of the temperature adjustment device can be performed with ease.

In the above storage, the temperature adjustment device may include a heat-exchange element, and a casing that accommodates the heat-exchange element, and that has, on its surfaces, a plurality of openings and a plurality of openable/closable windows.

By this means, heat can be exchanged between multiple rooms.

DETAILED DESCRIPTION OF THE INVENTION

Now, embodiments will be described below.

First Embodiment

Figure 1:
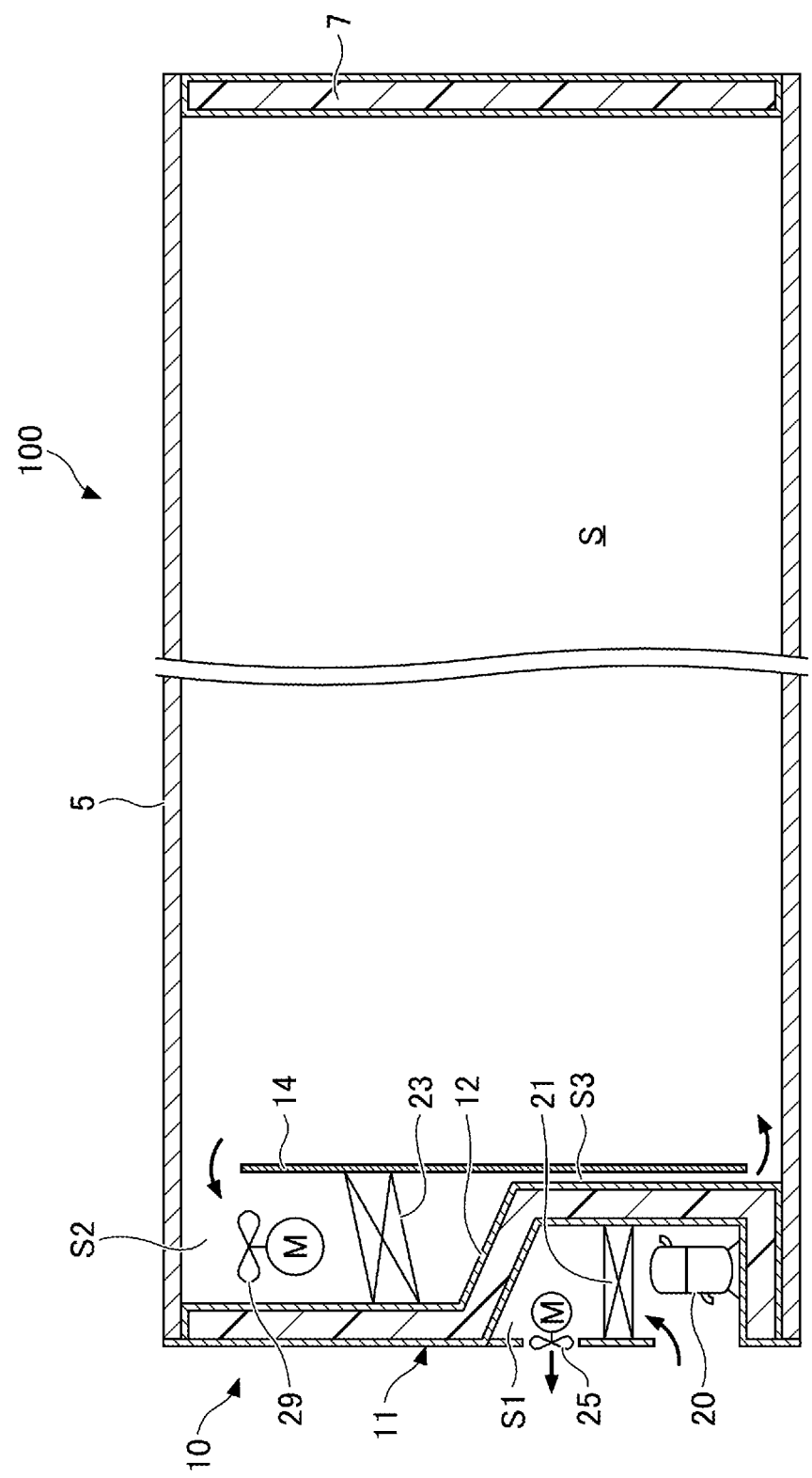
FIG. 1 is a vertical cross-sectional view that shows, partially, an example of a storage according to a first embodiment.
Figure 2:
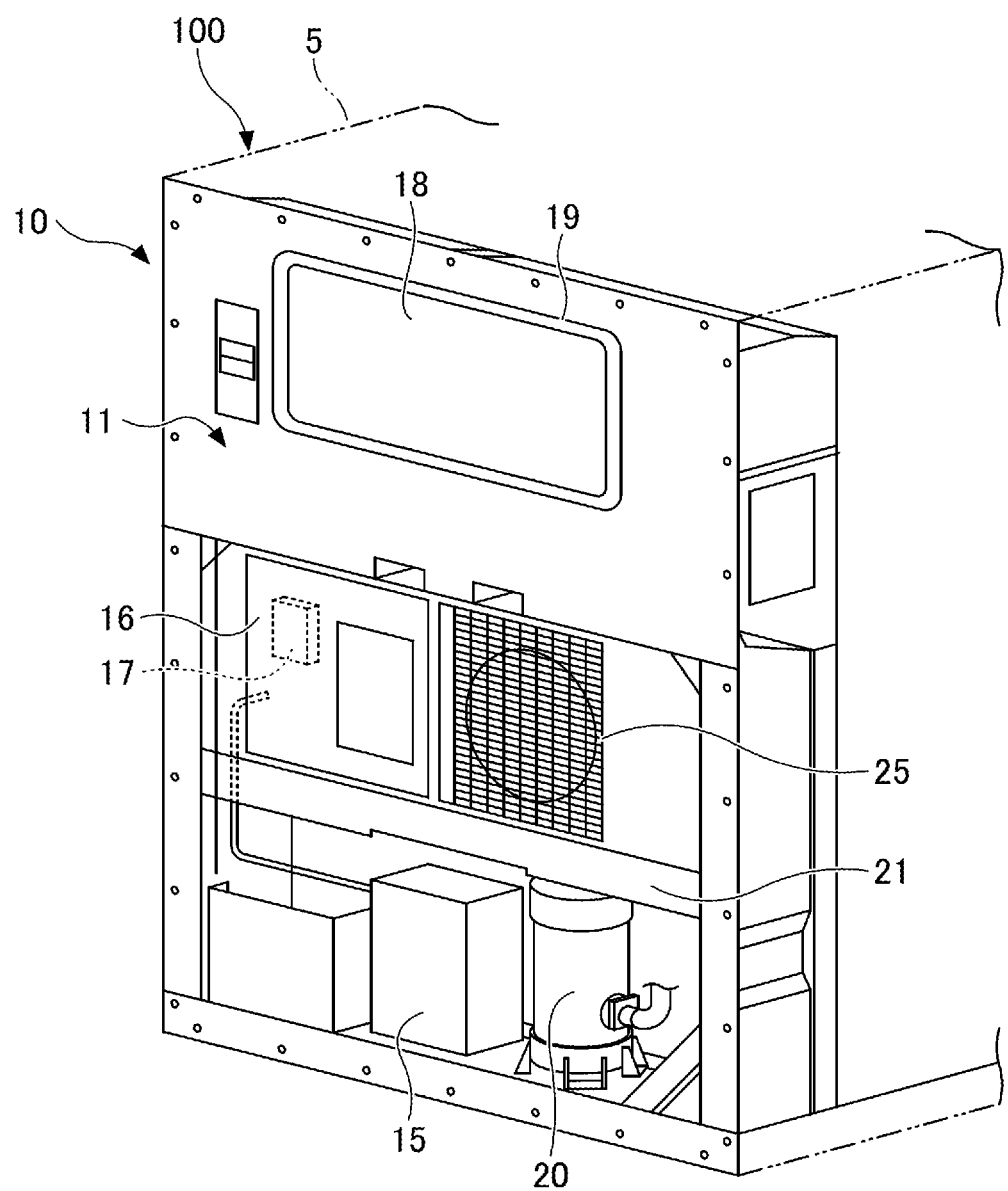
FIG. 2 is an outer perspective view that shows, partially, an example of a refrigerator according to the first embodiment.

FIG. 1 is a vertical cross-sectional view that shows, partially, an example of a storage according to a first embodiment. FIG. 2 is an outer perspective view that shows, partially, an example of a storage according to the first embodiment. As shown in FIG. 1, a storage 100 is a refrigerator that includes a mobile container 5 for storing goods such as fresh food, chemical products, pharmaceuticals, and so forth, a freezer 10 for adjusting the temperature of the inner space S of the container 5. The storage 100 can be applied to, for example, reefer containers used for land transportation, marine transportation, and so forth.

The container 5 is a mobile container used for land transportation, marine transportation, and so forth. The container 5 is formed in a rectangular, parallelepiped box-like shape. One end part of the container 5 is open in the longitudinal direction. One end part of the container 5 is closed with the freezer 10. At the other end part of the container 5, a loading/unloading port for loading the cargo to be stored or unloading the cargo stored in the inner space S is formed, and the loading/unloading port is closed by an openable/closable door 7. The freezer 10 is a freezing machine that cools down the interior of the container 5 used for land transportation, marine transportation, and so forth. The freezer 10 has a refrigerant circuit that performs refrigeration cycle operations, and the refrigerant circuit includes a compressor 20, a heat sink 21, an expansion valve (not shown), and an evaporator 23. The freezer 10 is attached to one end part of the container 5, and closes that end part of the container 5.

The freezer 10 includes a casing 11, and a partition plate 14 that is provided on the back of the casing 11 (on the inner side with respect to the container 5). Below the casing 11, a protruding part 12, which protrudes toward the inside of the container 5, is formed. Inner space of the protruding part 12 (space on the outer side with respect to the container 5) is formed as an outer storage space S1. An inner storage space S2, positioned above the protruding part 12, is formed in an upper part of the back of the casing 11.

The compressor 20, the heat sink 21, an outer fan 25, an inverter box 15, and an electrical equipment box 16 are accommodated in the outer storage space S1.

The compressor 20 delivers the refrigerant to the heat sink 21. The heat sink 21 exchanges heat between the refrigerant and the air outside the container 5. The outer fan 25 is placed above the heat sink 21, and forms an airflow that passes through the heat sink 21. An inverter circuit board (not shown) connected to the compressor 20 is accommodated in the inverter box 15. A controller 17 for controlling the operation of the freezer 10 and the like are accommodated in the electrical equipment box 16.

The controller 17 controls each device of the storage 100 based on operation commands and sensor detection signals. The controller 17 is a control device including a processor and a memory. The functions of the controller 17 are implemented as programs stored in the memory are executed on the processor, which is a CPU (Central Processing Unit) or the like. The functions of the controller 17 may be implemented by an FPGA (Field Programmable Gate Array) or an ASIC (Application-Specific Integrated Circuit).

The placement of devices in the outer storage space S1 is an example and can be changed as needed.

The evaporator 23 and an inner fan 29 are provided in the inner storage space S2. The inner fan 29 supplies the air inside the container 5 to the evaporator 23, and the evaporator 23 cools the air inside the container 5 by removing heat from the air with the refrigerant flowing in a heat transfer tube. Between the protruding part 12 and the partition plate 14, an inner air channel S3 is formed, in which the air inside the container 5 flows. The upper end of the inner air channel S3 communicates with the inner storage space S2, and the lower end of the inner air channel S3 communicates with the inner space S.

An opening 19 for maintenance (for service) is formed in the casing 11. The opening 19 is closed by a service door 18, which can be opened and closed. The service door 18, like the casing 11, is structured to include an outer wall, an inner wall, and a heat-insulating material.

Figure 3:
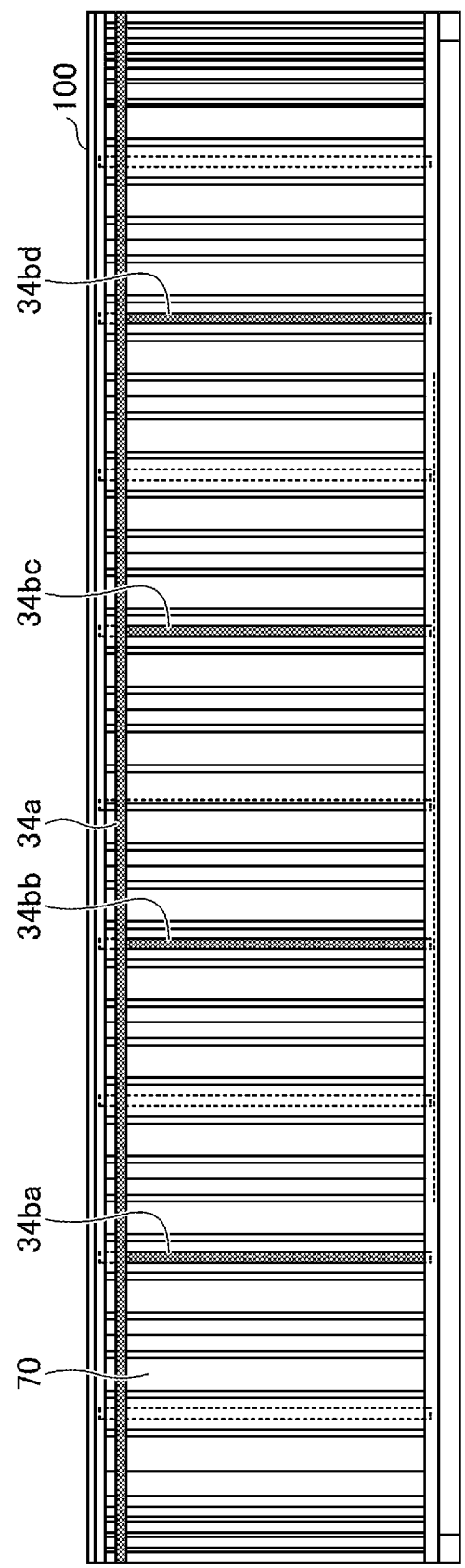
FIG. 3 is a vertical cross-sectional view that shows, partially, an example of the storage according to the first embodiment.

FIG. 3 is a vertical cross-sectional view that shows, partially, an example of the storage according to the first embodiment, explicitly showing the inner wall side surface 70 of the storage 100. A horizontal rail 34a and vertical rails 34b are formed in the side surface 70. In this example, multiple vertical rails 34ba, 34bb, 34bc, and 34bd are illustrated as examples. The number of vertical rails 34b may be one or more.

The horizontal rail 34a extends in a direction along the inner wall of the storage 100. In this example, the horizontal rail 34a is provided on the side surface 70 of the storage 100 so as to extend in the horizontal direction and the longitudinal direction of the storage 100. The horizontal rail 34a need not be provided directly on the side surface 70, and may be provided with an offset toward the inside of the storage 100, with respect to the side surface 70. The horizontal rail 34a may be provided on the ceiling surface of the inner wall of the storage 100.

The vertical rail 34b is provided on the side surface 70 of the storage 100 so as to extend vertically. The vertical rails 34b need not be provided directly on the side surface 70, and may be provided with an offset toward the inside of the storage 100, with respect to the side surface 70. When multiple vertical rails 34b are arranged in the longitudinal direction of the storage 100, these vertical rails 34b may be placed at equal intervals or at varying intervals.

Figure 4:
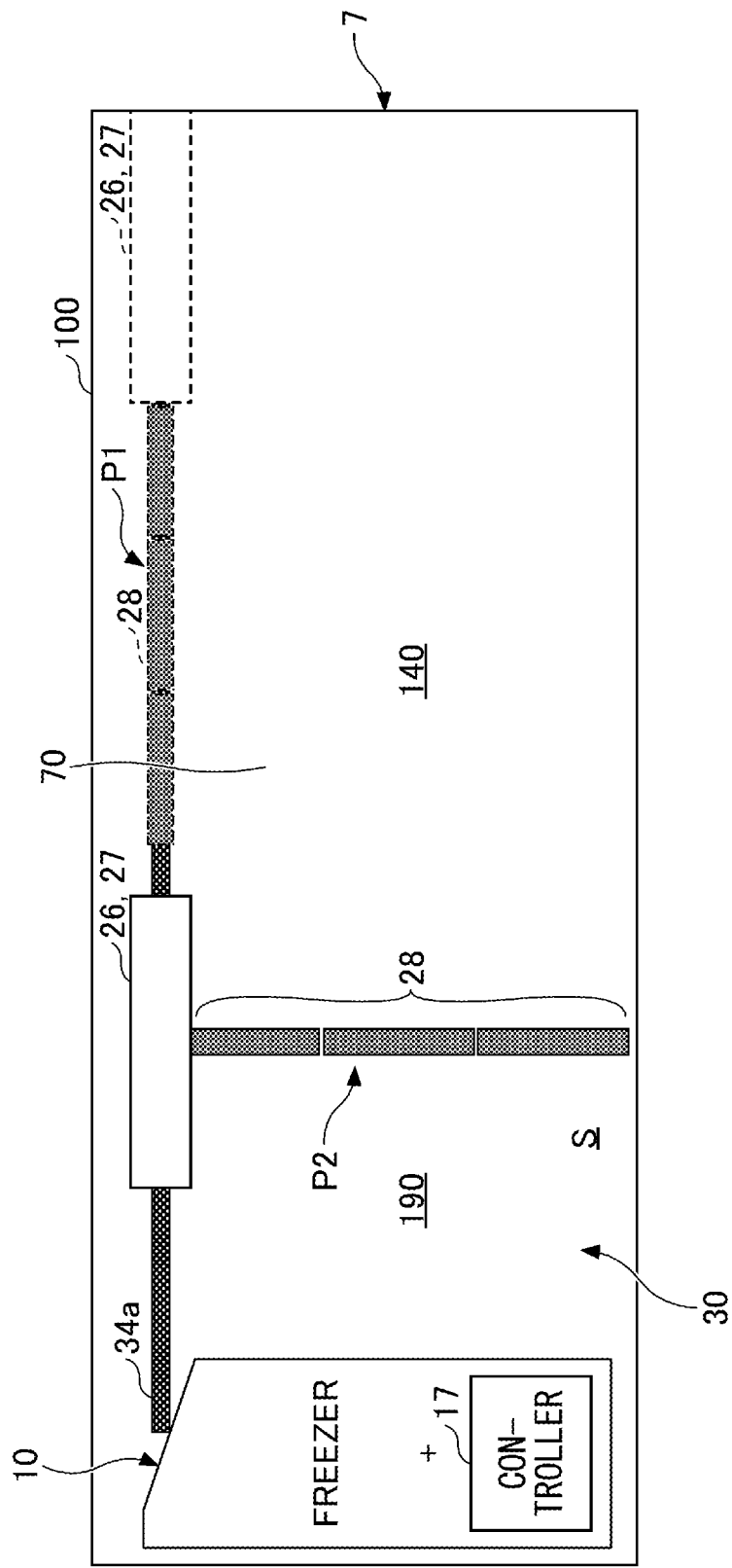
FIG. 4 is a vertical cross-sectional view for explaining an example of movement of a partition in the storage according to the first embodiment.

FIG. 4 is a vertical cross-sectional view for explaining an example of movement of partitions in the storage according to the first embodiment. The storage 100 has a storage chamber 30, a partition plate 28, and a temperature adjustment device 27.

The storage chamber 30 has an inner space S for storing goods. The partition plate 28 is provided so as to move back and forth in directions along the inner walls of the storage chamber 30, and is an example of a partition that divides the storage chamber 30 into multiple rooms. FIG. 4 illustrates an example state in which the storage chamber 30 is divided into two rooms 140 and 190 by the partition plate 28. The temperature adjustment device 27 is provided so as to move back and forth in a direction along the inner wall of the storage chamber 30, and adjusts the rooms 140 and 190 divided by the partition plate 28 to different temperatures. The storage 100 is structured thus, so that it is possible to create environments with different temperatures per room divided by the partition plate 28. The partition plate is also referred to as a "partition wall."

The temperature adjustment device 27 adjusts the amount of airflow or exchange of heat between rooms divided by the partition plate 28, according to operation commands from the controller 17. The room temperature set by the temperature adjustment device 27 may be higher in either the room 140 or the room 190. However, since the heat in the room 140 is more likely to escape to the outside of the storage 100 when the openable/closable door 7 is open, it is preferable to set the temperature in the room 140 higher than the temperature set in the room 190.

The temperature adjustment device 27 and partition plate 28 move along the horizontal rail 34a, and the partition plate 28 moves along one of the vertical rails 34ba, 34bb, 34bc, and 34bd (see FIG. 3). By this means, the size of each of room 190 and room 140 can be changed selectively. For example, when the volume of the room 190 that is subjected to the cooling process (which may include the freezing process) is reduced, the size of the room 190 also becomes smaller, so that the effect of cooling goods in the room 190 can be improved.

In the example shown in FIG. 4, the room 190 that is subject to the cooling process is located between the freezer 10 and the room 140, which is for refrigeration or for preservation of freshness, so that it becomes easy to use the cooling/freezing function of the freezer 10 for the cooling process in the room 190.

The freezer 10 adjusts the refrigerating temperature or freezing temperature in the room 190 according to operation commands from the controller 17.

The temperature adjustment device 27 may move in a direction along the inner wall of the storage chamber 30, in conjunction with the movement of the partition plate 28. By this means, the temperature adjustment device 27 moves in that direction as the partition plate 28 moves, so that the temperature adjustment device 27 can be moved with ease compared to a structure in which the temperature adjustment device 27 and the partition plate 28 move in that direction individually. For example, as the partition plate 28 moves in the longitudinal direction and the horizontal direction of the storage 100, the temperature adjustment device 27 also moves in the same direction.

The partition plate 28 may be provided so as to move back and forth between a first position P1, at which the partition plate is stored along the inner wall of the storage chamber 30, and a second position P2, at which the partition plate 28 divides the storage chamber 30 into multiple rooms. When so doing, the temperature adjustment device 27 may move in a direction along the inner wall of the storage chamber 30, in conjunction with the movement of the partition plate 28 between the first position P1 and the second position P2. By this means, the temperature adjustment device 27 can be moved with ease, in conjunction with the movement of the partition plate 28 between the first position P1 and the second position P2.

Note that the first position P1 where the partition plate 28 is stored is located on the openable/closable door 7 side with respect to the second position P2 in this example, but the first position P1 may be located on the freezer 10 side with respect to the second position P2 as well. The position where the temperature adjustment device 27 is accommodated is also located on the openable/closable door 7 side with respect to the second position P2 in this example, but this position may also be located on the freezer 10 side with respect to the second position P2.

The partition plate 28 may be positioned along the inner wall of the storage chamber 30 when the partition plate 28 is stored along the inner wall of the storage chamber 30, and may be positioned so as to face a direction along the inner wall of the storage chamber 30 (in the example shown in FIG. 4, the horizontal direction and the longitudinal direction of the storage 100) when the partition plate 28 divides the storage chamber 30 into multiple rooms. By this means, the partition plate 28 is less likely to be cumbersome when it is stored, and can divide the storage chamber 30 into multiple rooms (the room 140 and the room 190 in the example shown in FIG. 4) in that direction.

As shown in FIG. 4, when the partition plate 28 divides the storage chamber 30 into multiple rooms, the temperature adjustment device 27 may span these rooms. By this means, it is possible to create environments with different temperatures per room divided by the partition plate 28, with ease. For example, the temperature adjustment device 27 can adjust the amount of airflow or exchange of heat between these rooms with ease.

The temperature adjustment device 27 may be provided so as to be moved back and forth, manually, along the inner wall of the storage chamber 30, or may be configured to move back and forth, automatically, in that direction. For example, the storage 100 may have a partition plate moving device 26 that moves the partition plate 28 upon receiving a move command from the controller 17.

For example, the temperature adjustment device 27, the partition plate moving device 26, and the partition plate 28 may move along the horizontal rails 34a. By this means, the partition plate moving device 26 moves in the same direction as the temperature adjustment device 27 and the partition plate 28, so that it becomes easy to secure a space in which the partition plate moving device 26 moves.

The change of position of the partition plate 28 is made possible by, for example, the following mechanism.

Figure 5A:
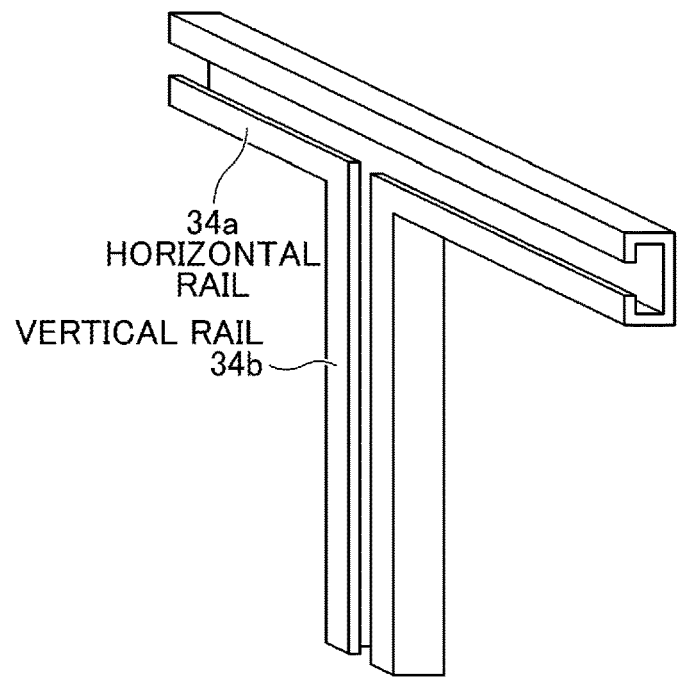
FIG. 5A is a perspective view that shows an example of a horizontal rail and a vertical rail.
Figure 5B:
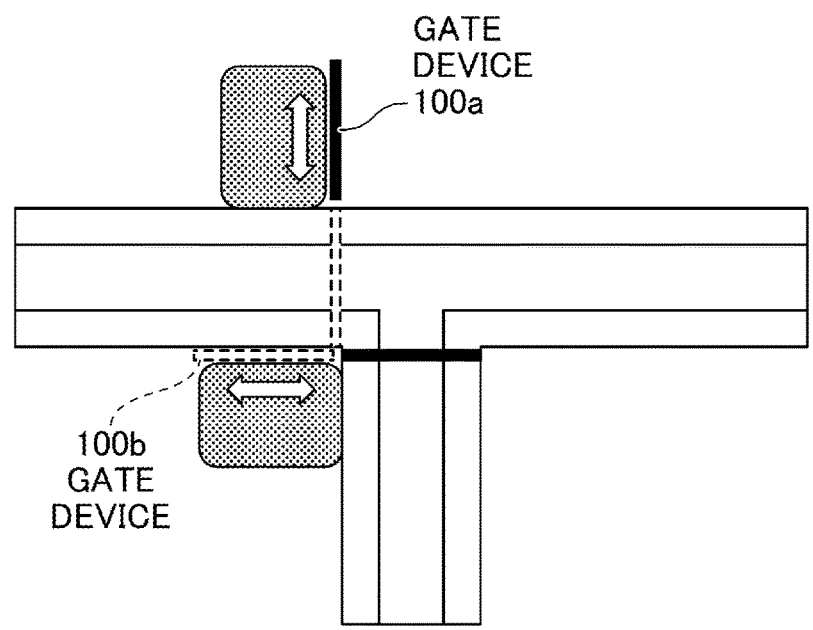
FIG. 5B is a perspective view that shows an example of a horizontal rail and a vertical rail.

FIG. 5A is a perspective view that shows an example of a horizontal rail and a vertical rail. When moving the position of the partition plate 28, rails 34 including the horizontal rail 34a and the vertical rail 34b shown in FIG. 5A are used. The gate device 100a and gate device 100b of FIG. 5B are attached to the part where the rails 34 form the letter "T."

The gate device 100a can move a plate electrically such that the plate is inserted in the rail and blocks the movement of the partition plate 28 in the horizontal direction. Also, the gate device 100b can move a plate electrically such that the plate is inserted in the rail and blocks the movement of the partition plate 28 in the vertical direction. By controlling the gate device 100a and the gate device 100b, it is possible to choose the vertical rail 34b for moving the partition plate 28 downward, and control the position to set up the partition plate 28. For example, in the T-part of the vertical rail 34b for moving the partition plate 28 downward, the plate of the gate device 100a is inserted in the rail, and the plate of the gate device 100b is not inserted in the rail.

Figure 6A:
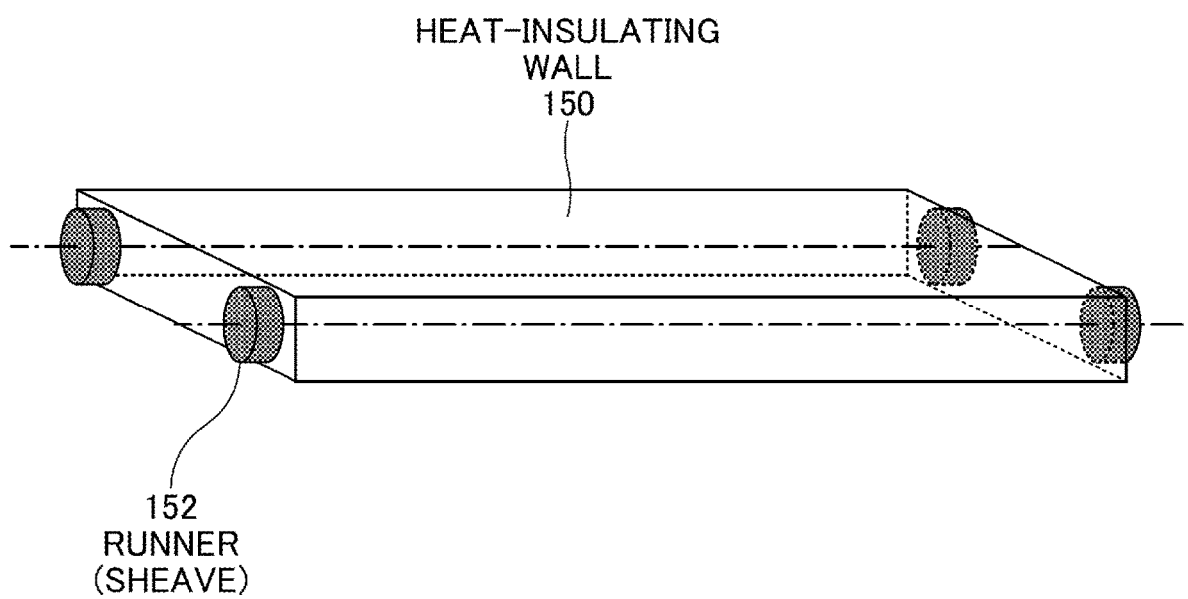
FIG. 6A is a diagram that shows an example of a heat-insulating wall in a partition.
Figure 6B:
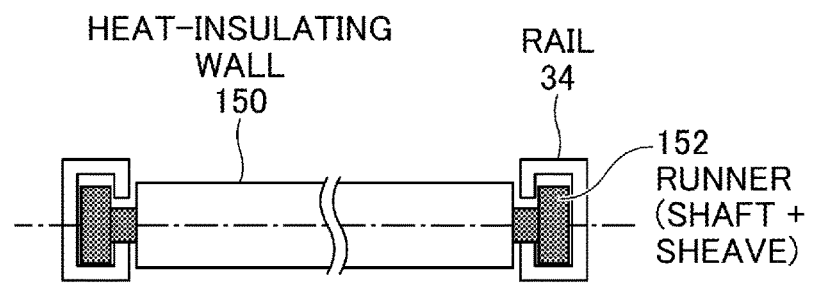
FIG. 6B is a diagram that shows an example of a heat-insulating wall in a partition.

The partition plate 28 is realized with a heat-insulating wall 150 with runners 152, as shown in FIG. 6A. The heat-insulating wall 150 with the runners 152 is placed in the position relationship with the rails 34 as shown in FIG. 6B, and therefore can move along the rails 34.

Figure 7:
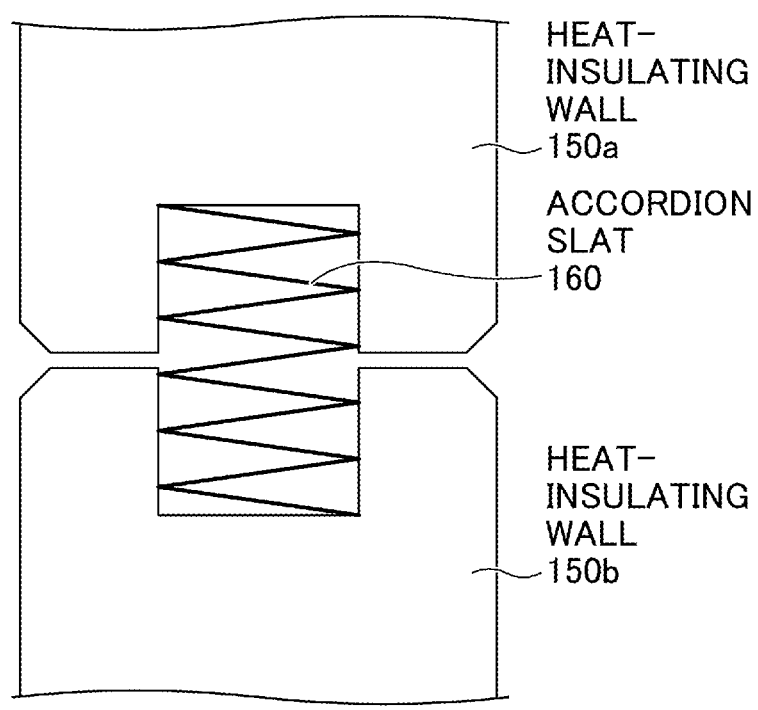
FIG. 7 is a diagram that shows an example structure for connecting adjacent heat-insulating walls.
Figure 8:
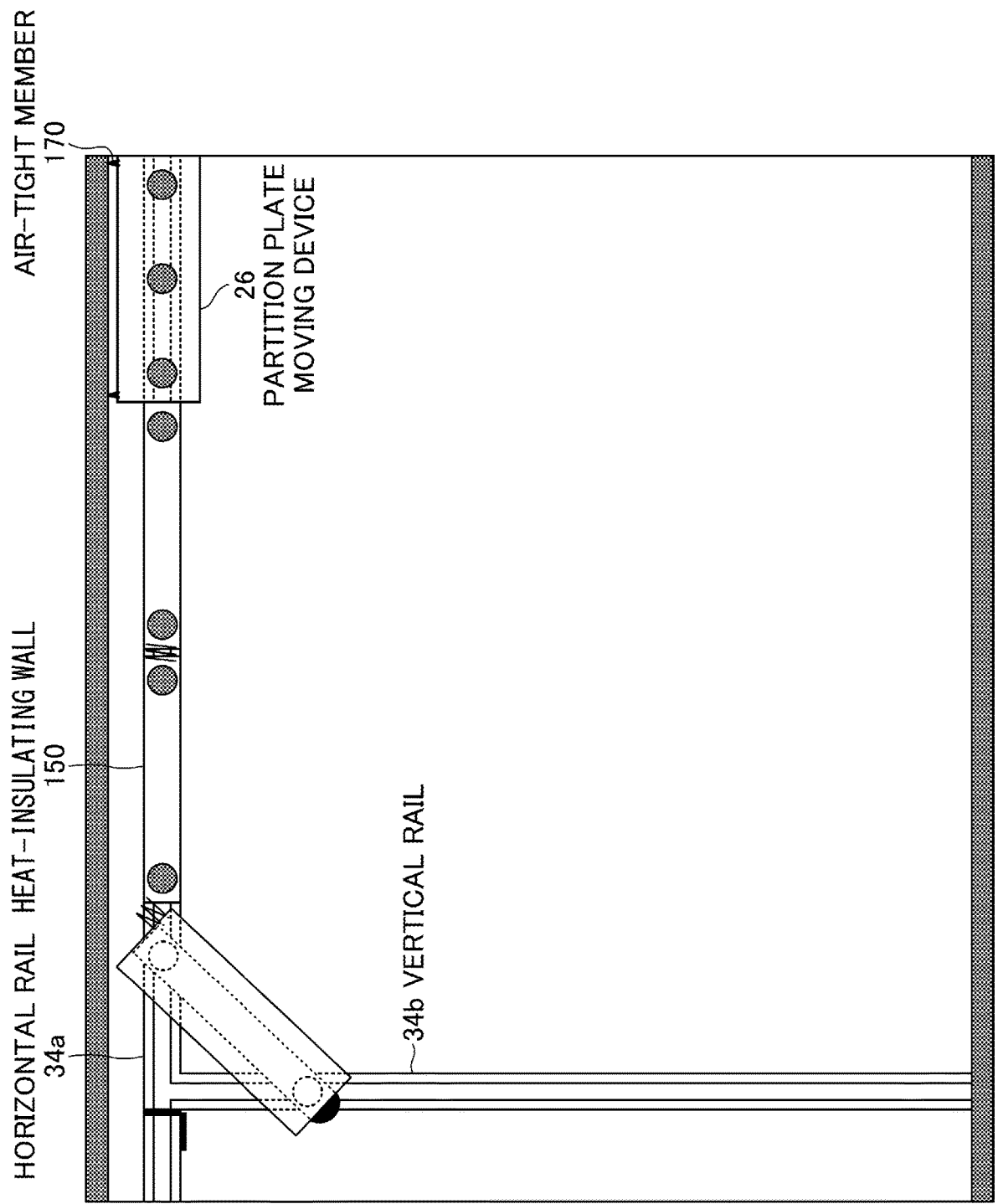
FIG. 8 is a diagram for explaining an example mechanism for changing the position of a partition plate.
Figure 9:
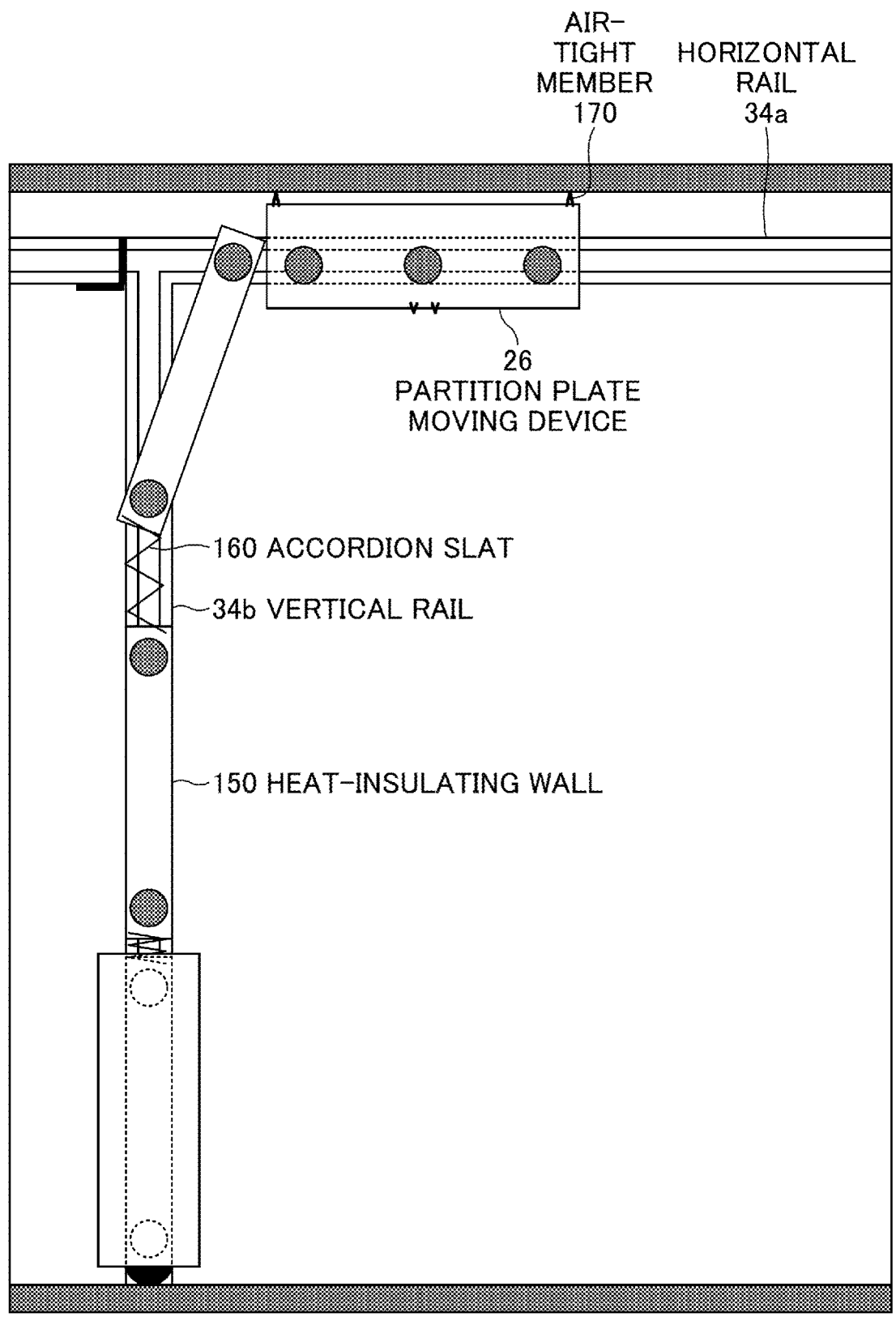
FIG. 9 is a diagram for explaining an example mechanism for changing the position of a partition plate.
Figure 10:
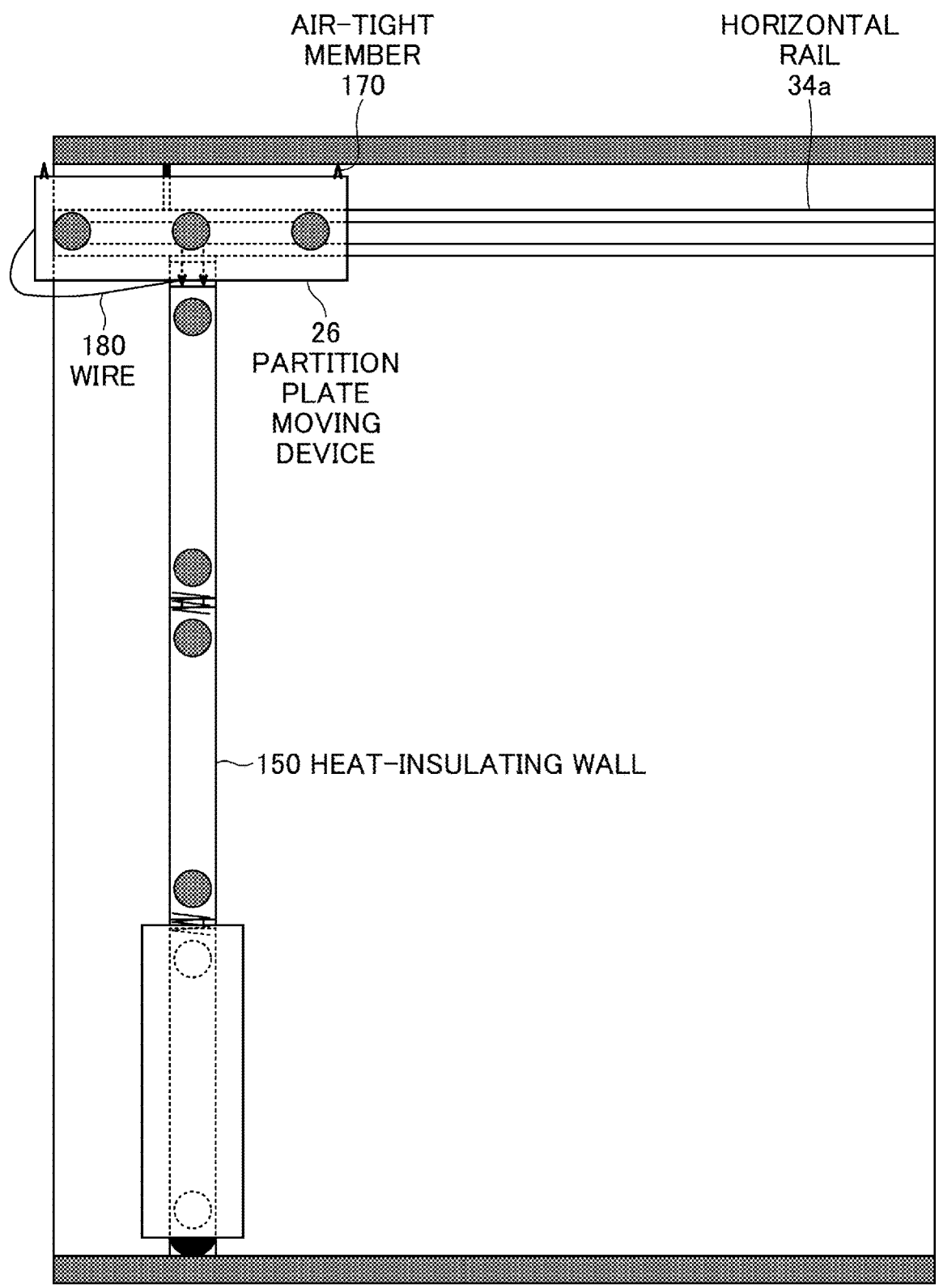
FIG. 10 is a diagram for explaining an example mechanism for changing the position of a partition plate.

The partition plate 28 has a partition surface, in which multiple heat-insulating walls 150 are connected in an accordion-like manner with an accordion slat 160 (FIG. 7 shows an example with two adjacent heat-insulating walls 150a and 150b). The heat-insulating walls 150 are an example of slats, and the partition surface is formed by connecting multiple heat-insulating walls 150. The heat-insulating walls 150a and 150b are connected by the accordion slat 160, so that, as shown in FIG. 5A, a turn from the horizontal rail 34a to the vertical rail 34b can be made at the T-part of the rails 34 (see FIG. 8 to FIG. 10).

Figure 11:
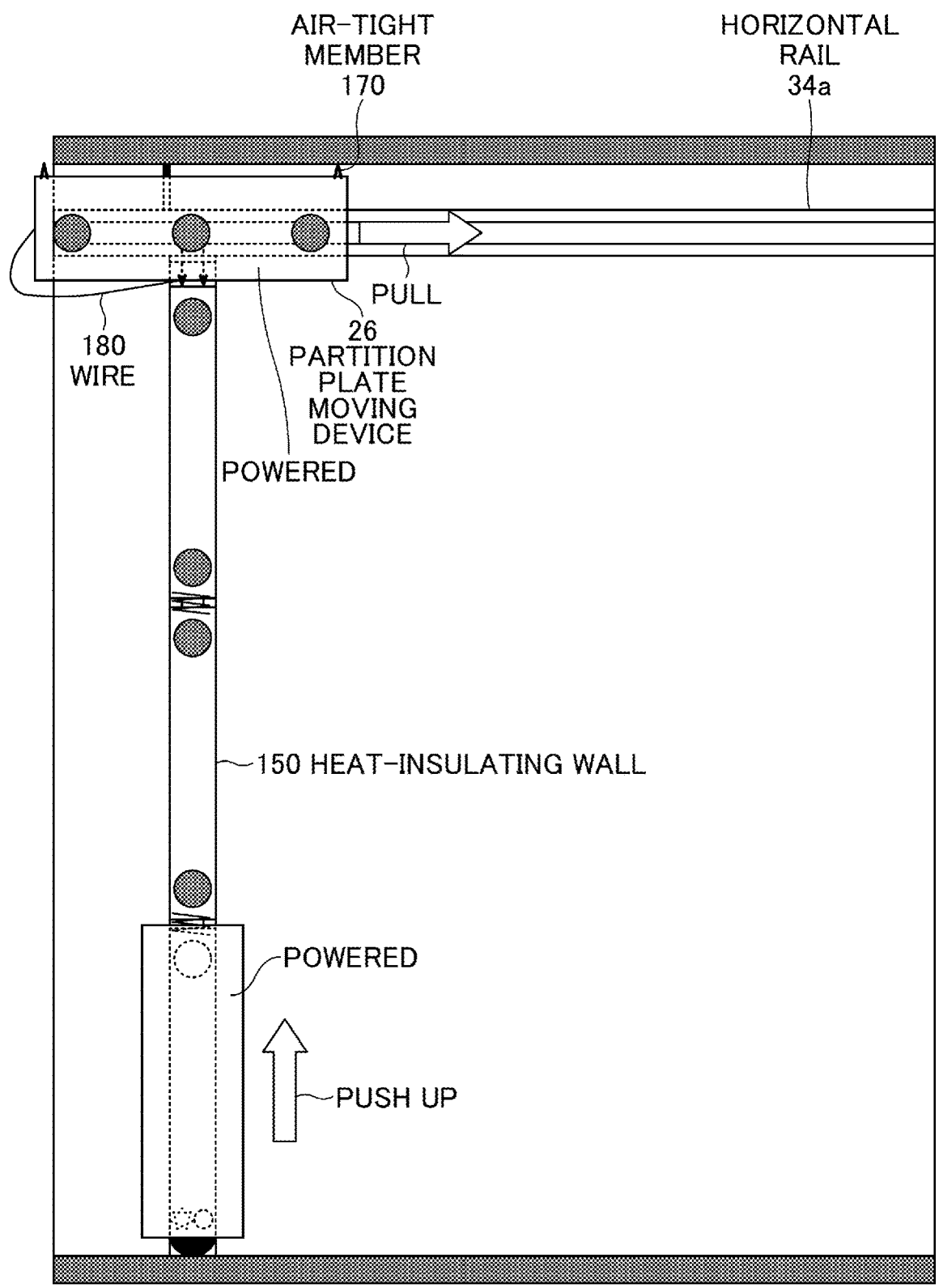
FIG. 11 is a diagram for explaining an example mechanism for changing the position of a partition plate.

Also, the partition plate 28 that is set up can be removed as follows. The partition plate 28 set up as shown in FIG. 11 is pulled up from the vertical rail 34b to the horizontal rail 34a by the pulling force of the powered partition plate moving device 26, and by the upward pushing force of the powered lowermost heat-insulating wall 150. Note that the partition plate moving device 26 and the heat-insulating wall 150 are connected by a wire 180.

Figure 12:
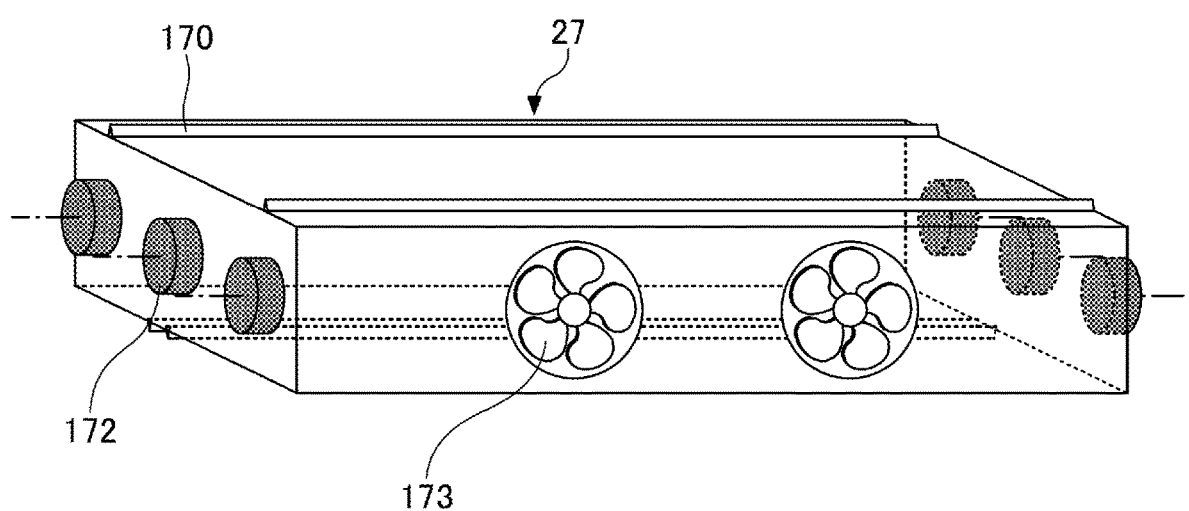
FIG. 12 is a perspective view that shows an example structure of a temperature adjustment device.

FIG. 12 is a perspective view that shows an example structure of the temperature adjustment device 27. The temperature adjustment device 27 has runners 172 on both side surfaces, and has air outlets 173 for temperature adjustment on the front and rear surfaces. The runners 172 face the side surface 70 of the inner wall of the storage 100, and the air outlets 173 face the rooms divided by the partition plate 28. The air-tight member 170 is provided to fill the gap between the temperature adjustment device 27 and the inner wall of the storage 100, and prevents air from passing through the gap. The air-tight member 170 is rubber, for example.

Figure 13:
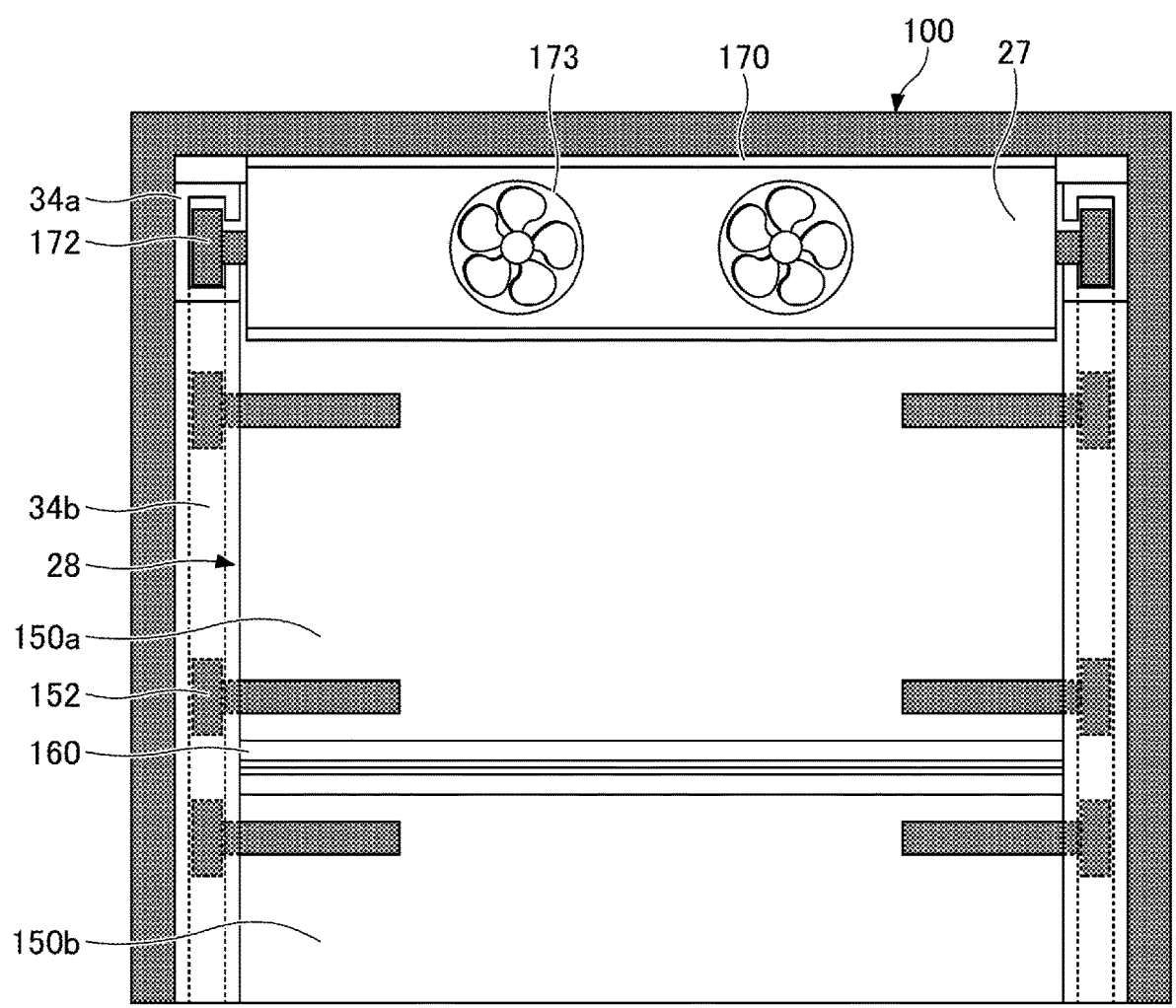
FIG. 13 is a front view that shows an example state in which a partition plate and a temperature adjustment device are set up.

FIG. 13 is a front view that shows an example state in which the partition plate 28 and the temperature adjustment device 27 are set up. The runners 172 protrude from both side surfaces of the temperature adjustment device 27, and are guided in the horizontal direction by the horizontal rail 34a. Runners 152 protrude from both side surfaces of multiple heat-insulating walls 150 in the partition plate 28, and are guided along the vertical rail 34b when moving in the vertical direction, and guided along the horizontal rail 34a when moving in the horizontal direction.

Figure 14:
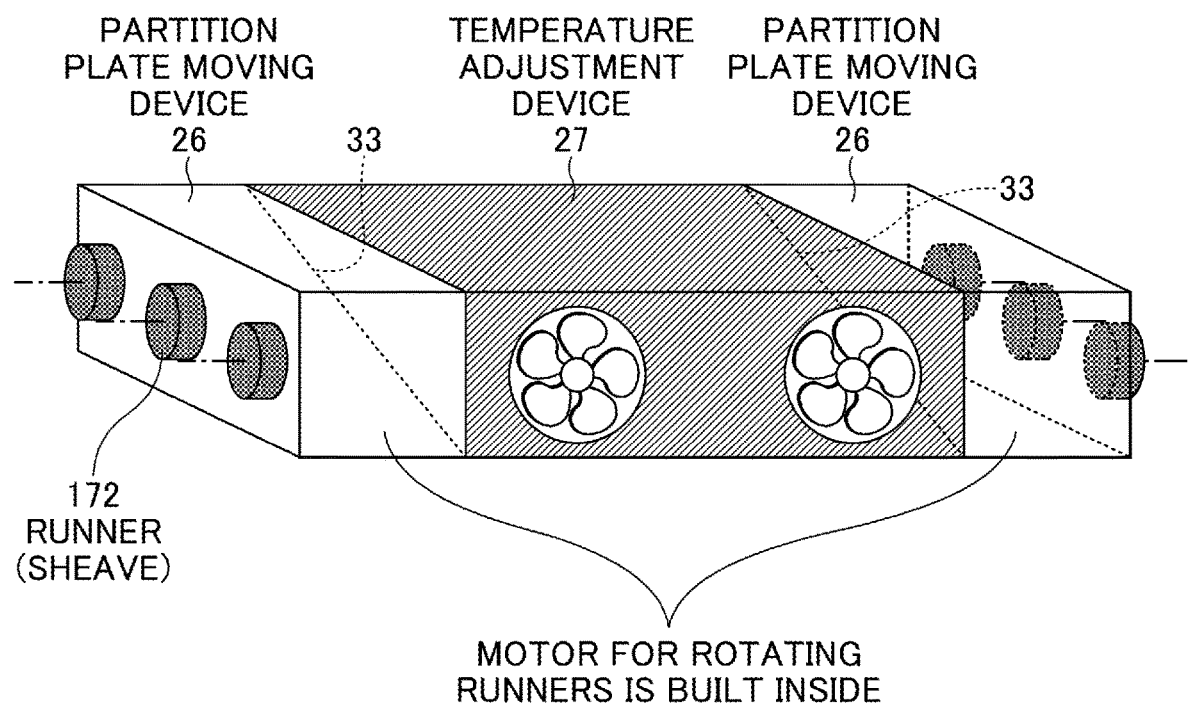
FIG. 14 is a perspective view that shows an example structure of a temperature adjustment device and a partition plate moving device.

FIG. 14 is a perspective view that shows an example structure of the temperature adjustment device 27 and the partition plate moving device 26. The partition plate moving device 26 is set up on both sides of the temperature adjustment device 27, and moves together with the temperature adjustment device 27. The partition plate moving device 26 has a built-in motor for rotating the runners 172. Consequently, the partition plate moving device 26 can move along the horizontal rails 34a. The temperature adjustment device 27 adjusts the amount of airflow, or exchanges heat, between two temperature zones (for example, between the room 140 and the room 190).

Figure 15A:
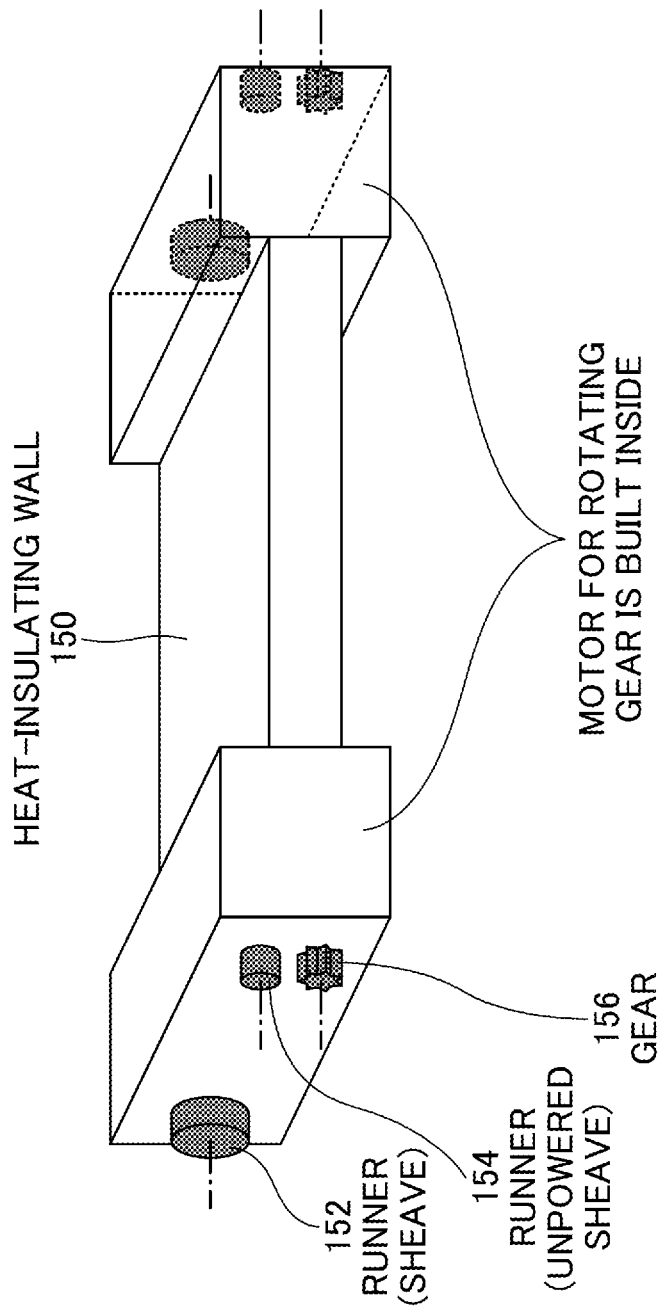
FIG. 15A is a diagram for explaining an example mechanism for changing the position of a partition plate.
Figure 15B:
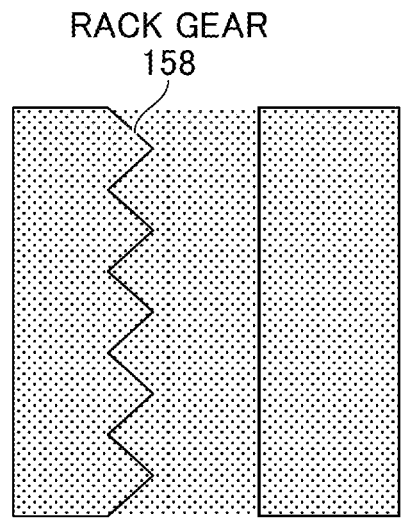
FIG. 15B is a diagram for explaining an example mechanism for changing the position of a partition plate.
Figure 15C:
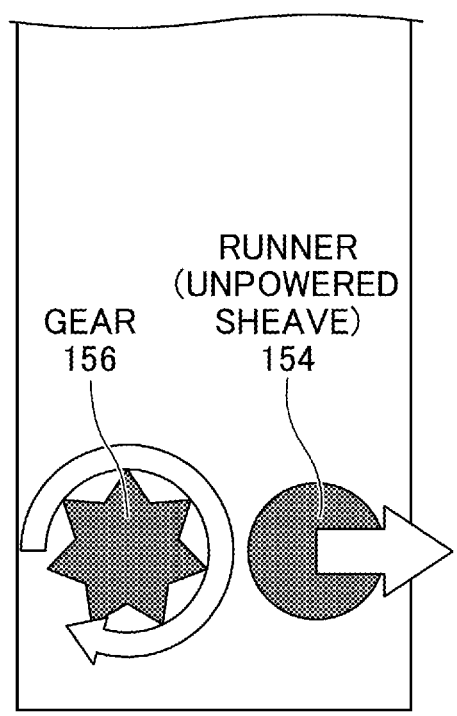
FIG. 15C is a diagram for explaining an example mechanism for changing the position of a partition plate.

The powered lowermost heat-insulating wall 150 is structured, for example, as shown in FIG. 15. The powered lowermost heat-insulating wall 150 includes a runner 152, a runner 154, and a gear 156, as shown in FIG. 15A. For example, a rack gear 158 is provided on one side of the vertical rail 34b, as shown in FIG. 15B. Also, as shown in FIG. 15C, the runner 154 is pressed against the vertical rail 34b on the opposite side of the rack gear 158 by a spring, for example. Consequently, the powered lowermost heat-insulating wall 150 can move up the vertical rail 34b, thereby pushing up the partition plate 28 along the vertical rail 34b.

Figure 16:
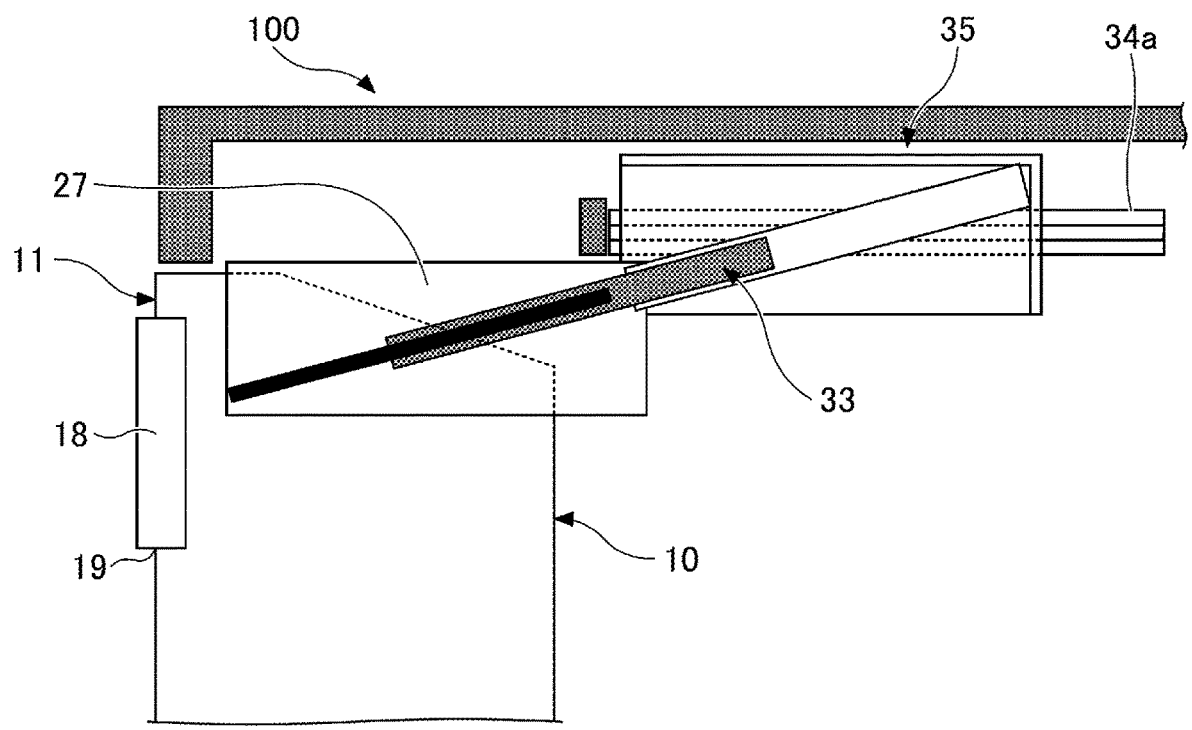
FIG. 16 is a cross-sectional view that shows an example of a guiding mechanism for guiding the temperature adjustment device to a service door.

FIG. 16 is a cross-sectional view that shows an example of a guiding mechanism 35 that guides the temperature adjustment device 27 to the service door 18. The service door 18 is an example of an outer door that separates the inside and the outside of the storage 100, and, for example, closes the opening 19, formed in the casing 11 of the freezer 10, such that the opening 19 can be opened and closed. The temperature adjustment device 27 may be provided so as to move back and forth, up to the service door 18. By this means, it becomes easy to access the temperature adjustment device 27 from outside the storage 100 through the service door 18, so that, for example, work such as replacement or repair of the temperature adjustment device 27 can be performed with ease.

The guiding mechanism 35 has slide rails 33 facing both side surfaces of the temperature adjustment device 27, and guides, by means of the slide rails 33, the temperature adjustment device 27 through the upper space of the freezer 10, to the service door 18.

Next, a second embodiment will be explained. In the second embodiment, parts that are the same as in the first embodiment will citing the description given hereinbefore, and not be described again.

Second Embodiment

Figure 17:
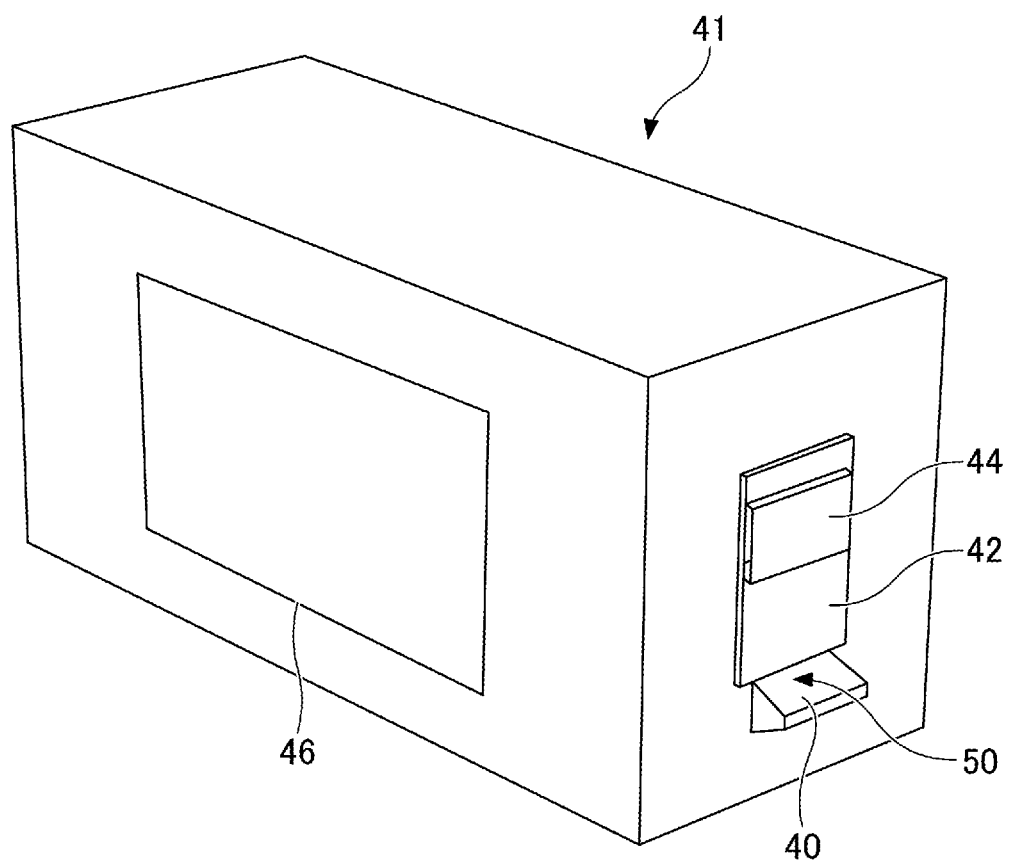
FIG. 17 is an external view that shows an example of a storage according to a second embodiment.

FIG. 17 is an external view that shows an example of a storage according to the second embodiment. The storage 41 shown in FIG. 17 is implemented by using, for example, a transportable refrigerator-freezer container, which is a transportation container. The refrigerator-freezer container has a refrigerating/freezing function and a storage area, which is an example of a temperature adjustment area using the refrigerating/freezing function. The temperature of the storage area is controlled by the refrigerating/freezing function. The quality of goods stored in the storage 41 is maintained by the temperature control.

The storage 41 has a warehousing function to put goods in the storage area, and a retrieving function to retrieve goods stored in the storage area. The warehousing function and the retrieving function can be realized by using an operating panel 40 and a reception device 50, for example.

The operating panel 40 includes, for example, an operation receiving part that receives operations from the user, and an information output part that displays information for the user on a screen, or outputs audio. The operation receiving part includes physical buttons for receiving operations from the user, a touch screen, a microphone for voice input, and so forth. The information output part includes, for example, a display device, a speaker, and so forth. The reception device 50 receives an operation for warehousing goods or an operation for retrieving goods, received from the user on the operating panel 40, and performs various controls.

The reception device 50 has a window 42 for putting goods in or out. Goods put at the window 42 by the user can be transported to the storage area by an automatic carrier device 43, which will be described later. Also, goods stored in the storage area can also be transported to the window 42 by the automatic carrier device 43.

A door 44 that can be opened and closed may be provided at the window 42. FIG. 17 shows an example state in which the door 44 is open.

The window 42 is used, for example, as a check-in window for checking in goods from outside the storage 41 to the inside of the storage 41, and also used as a check-out window for checking out goods from inside the storage 41 to the outside of the storage 41. However, the window 42 may be used as a window for checking in goods, and a window other than the window 42 may be used as a window for checking out goods. Alternatively, the window 42 may be used as a window for checking out goods, and a window other than the window 42 may be used a window for checking in goods. Thus, the check-in window and the check-out window may be one common window, or may be multiple separate windows.

A window other than the window 42 may be provided at different location from the window 42. In the example shown in FIG. 17, the window 42 is provided in the front surface of the storage 41, and another window 46, which is different from the window 42, is provided on a side surface of the storage 41. In the example shown in FIG. 17, the window 46 is larger than the window 42, but this is by no means limiting. The window 46 may be provided with a door that can be opened and closed like the window 42.

The structure of the storage 41 shown in FIG. 17 is an example. For example, insofar as the storage 41 is connected to a server such as a cloud server via a network such as the Internet, at least part of the information processing functions may be imparted to the server. The storage 41 may be designed such that an information terminal such as a smartphone the user has with him/her can be used as the operating panel 40. Obviously, the storage 41 in FIG. 17 has various example structures depending on the usage and purpose.

Figure 18A:
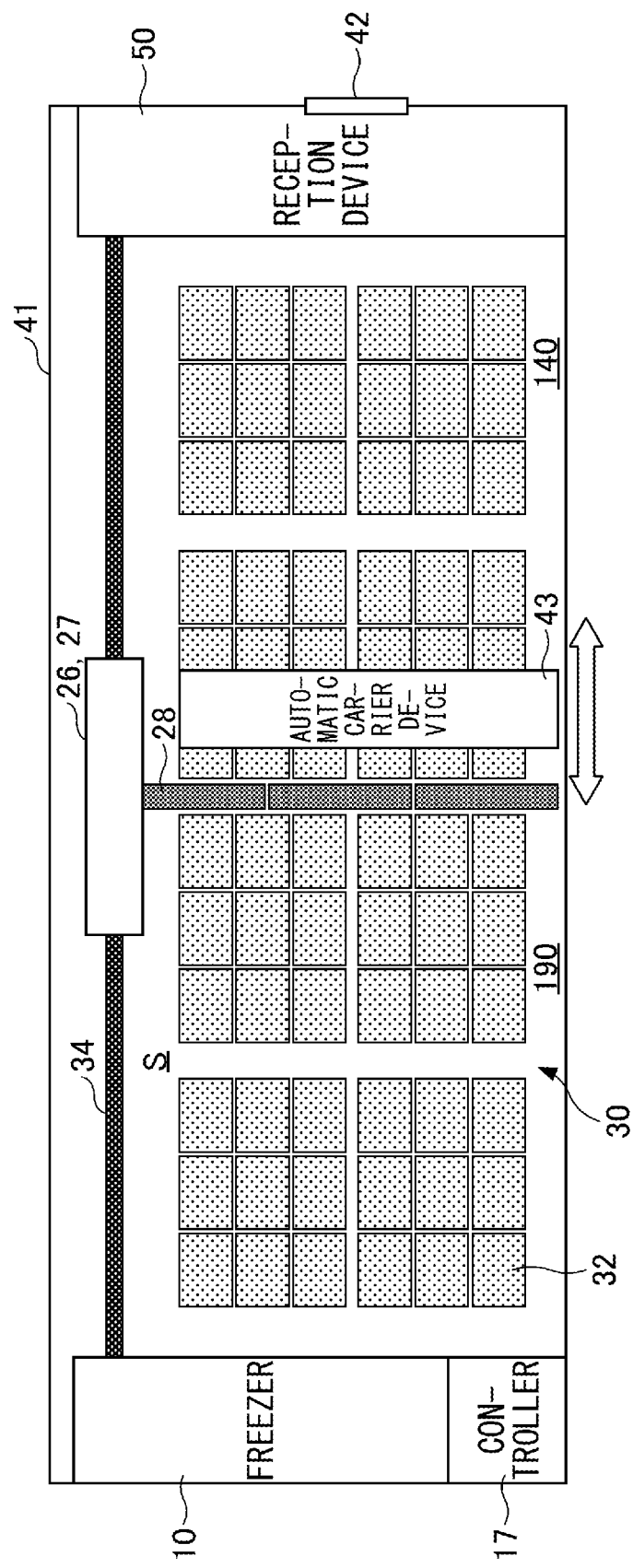
FIG. 18A is a cross-sectional view that shows an example of the storage according to the second embodiment.
Figure 18B:
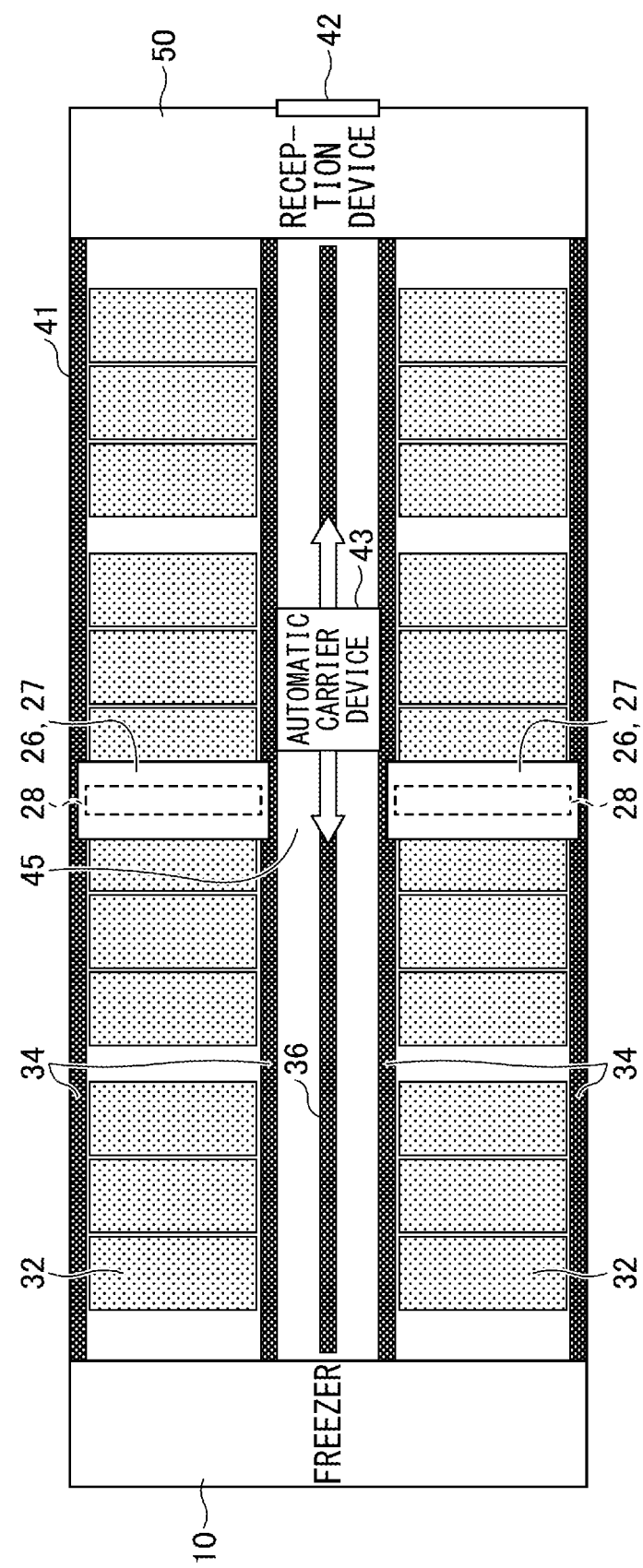
FIG. 18B is a cross-sectional view that shows an example of the storage according to the second embodiment.

FIGS. 18A and 18B are cross-sectional views of an example of a storage according to the second embodiment. FIG. 18A is a vertical cross-sectional view of the storage 41. FIG. 18B is a horizontal cross-sectional view of the storage 41. The storage 41 has, for example, a freezer 10 that provides a refrigerating/freezing function, at one end in the longitudinal direction, and has an reception device 50 at the other end in the longitudinal direction. The positions to place these devices are by no means limited to these. The refrigerating/freezing function of the freezer 10 allows the storage 41 to have a storage area with multiple shelves 32.

A shelf address is assigned to each shelf 32 in the storage area. Goods put in the storage 41 are transported from the reception device 50 to the shelves 32 in the storage area, by the automatic carrier device 43 that can move in the storage area along a bottom rail 36. Also, the automatic carrier device 43 can transport goods from one shelf 32 to another shelf 32. Also, goods to be taken out of the storage 41 are transported from the shelves 32 in the storage area to the reception device 50, by the automatic carrier device 43.

The shelves 32 in the storage 41 are set up on both sides so that goods can be put in from the window 46 on the side surface of the storage 41. The storage 41 illustrates an example in which the shelves 32 are provided in 2 groups, composed of 6 shelves in the vertical direction and 12 shelves in the horizontal direction. In the storage 41, gaps for setting up the partition plates 28 are provided every three shelves 32, in the horizontal direction. The partition plate moving device 26 and the temperature adjustment device 27 move along the rail 34, and the partition plate moving device 26 moves between positions where the partition plate 28 is set up.

By setting up the partition plate 28, the storage 41 can provide storage areas (temperature zones) with multiple setting temperatures. Also, the storage 41 can adjust the number of goods that can be stored in each storage area (storage area capacity) by moving the position to set up the partition plate 28.

The controller 17 controls the operations of the automatic carrier device 43, the freezer 10, the partition plate moving device 26, and so forth based on the user's operations received from the operating panel 40, thereby realizing the storage 41 according to this embodiment.

The reception device 50 is an example of an acquisition means for acquiring information about goods, the reception device 50 accepts an operation for warehousing goods or an operation for retrieving goods, from the user, and reports the detail of the operation received from the user to the controller 17.

Following commands from the controller 17, the automatic carrier device 43 transports goods that are brought in, from the window 42 to the storage area, transports stored goods from the storage area to the window 42, and transports goods from one shelf 32 to another shelf 32, and so forth. The automatic carrier device 43 is an example of an automatic carrier means, and can use transportation technologies, including existing carrier devices such as carrier robots, automatic machines, and so forth.

The storage 41 according to the second embodiment has the same structure as the storage 100 according to the first embodiment, and the temperature adjustment device 27 is configured to move back and forth along the inner wall of the storage chamber 30, and adjusts the rooms 140 and 190, divided by the partition plate 28, to different temperatures. The storage 41 is structured thus, so that it is possible to create environments with different temperatures per room divided by the partition plate 28.

The storage 41 may have a vent opening 45 where the automatic carrier device 43 can pass, so as to allow the automatic carrier device 43 to move back and forth between the room 190 and the room 140. The vent opening 45 may be a space formed between adjacent partition plates 28, or may be a through-hole formed in the partition plate 28.

Figure 19:
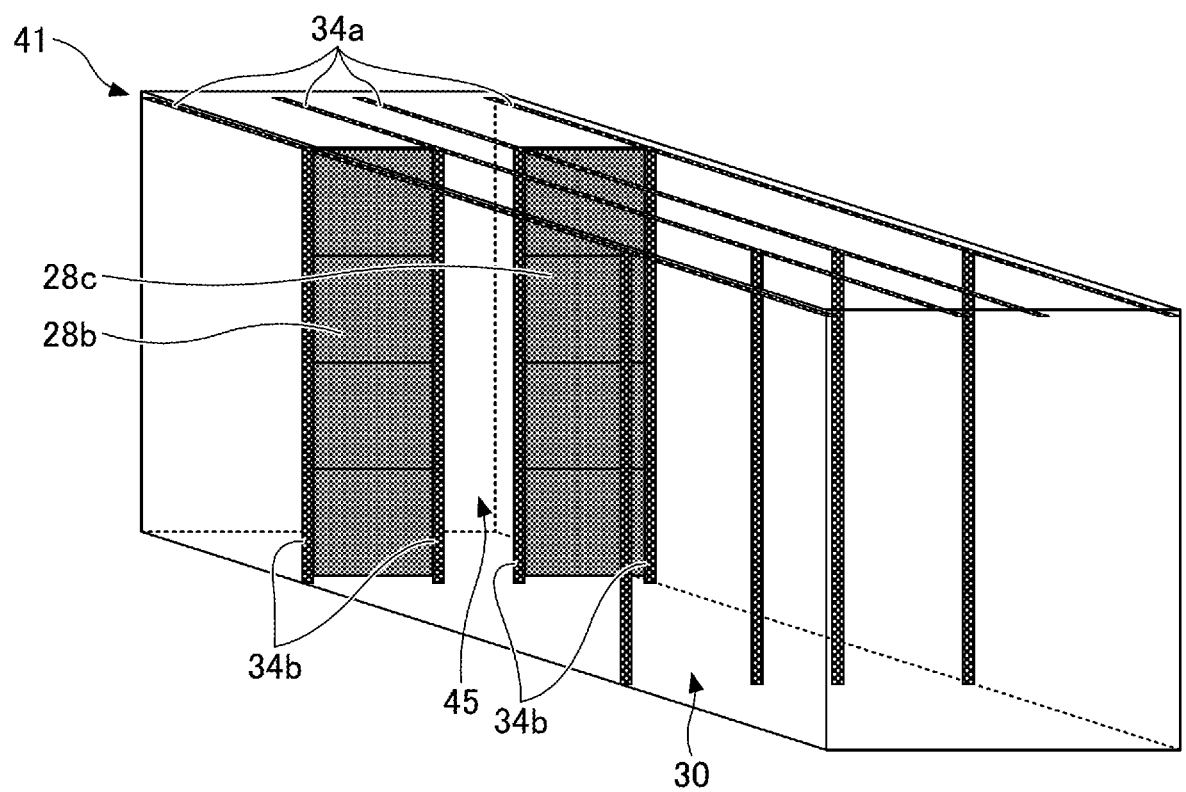
FIG. 19 is a perspective view for explaining a first example of a vent opening.

FIG. 19 is a perspective view for explaining a first example of the vent opening 45. The vent opening 45 is a space formed between two adjacent partition plates 28B and 28C. The two partition plates 28B and 28C move along horizontal rails 34*a*, formed in the ceiling part of the storage chamber 30, and along vertical rails 34*b*, extending vertically inside the storage chamber 30 (see FIG. 5 to FIG. 11). The temperature adjustment device 27 moves along the horizontal rails 34*a*, so that it is possible to create environments with different temperatures per room divided by the partition plates 28B and 28C.

Figure 20:
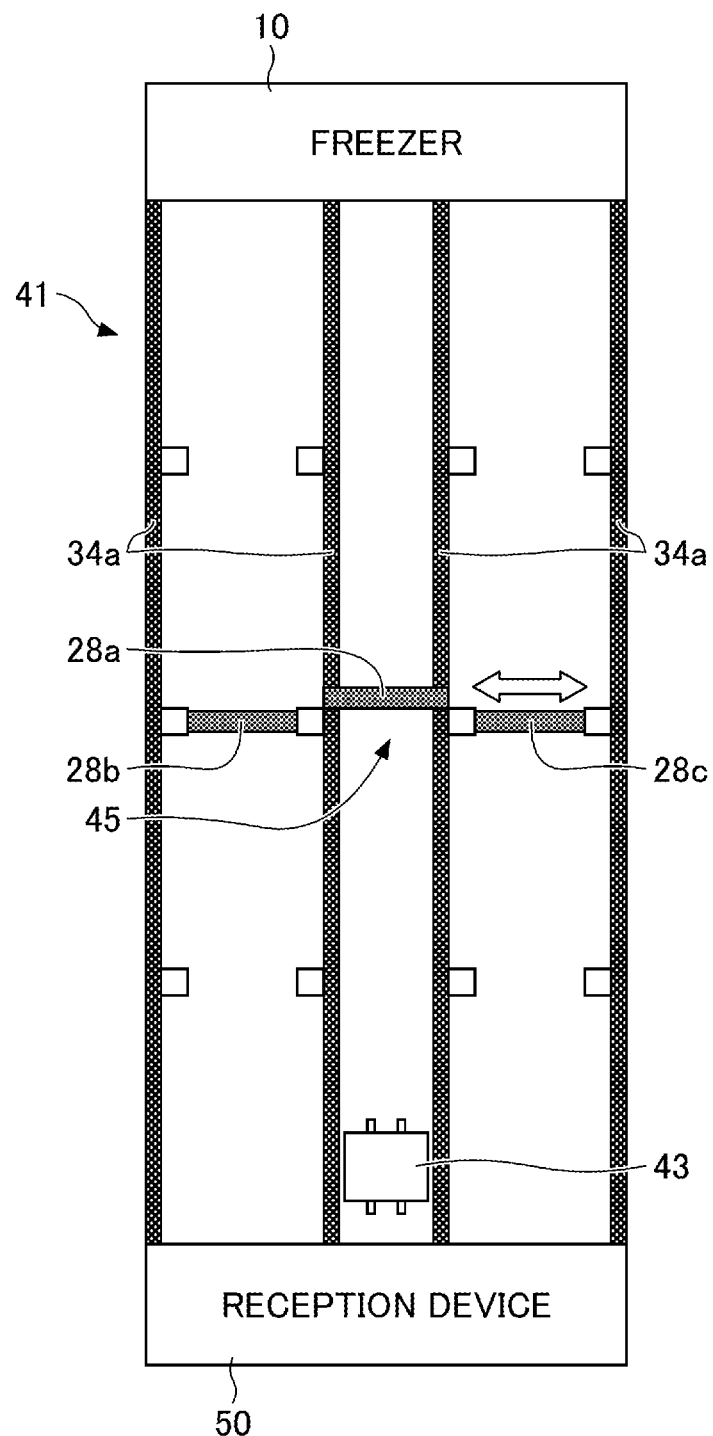
FIG. 20 is a plan view for explaining a second example of a vent opening.

FIG. 20 is a plan view for explaining a second example of the vent opening 45. The partition plate 28A slides such that it opens and closes the vent opening 45 formed between the two adjacent partition plates 28B and 28C. The partition plate 28A slides along the partition surfaces of the two partition plates 28B and 28C such that the partition plate 28A overlaps the partition plate 28B side or the partition plate 28C side in front view. The three partition plates 28A, 28B, and 28C move along the horizontal rails 34*a* formed in the ceiling part of the storage chamber 30. The temperature adjustment device 27 moves along the horizontal rails 34*a*, so that it is possible to create environments with different temperatures per room divided by the partition plates 28.

Figure 21:
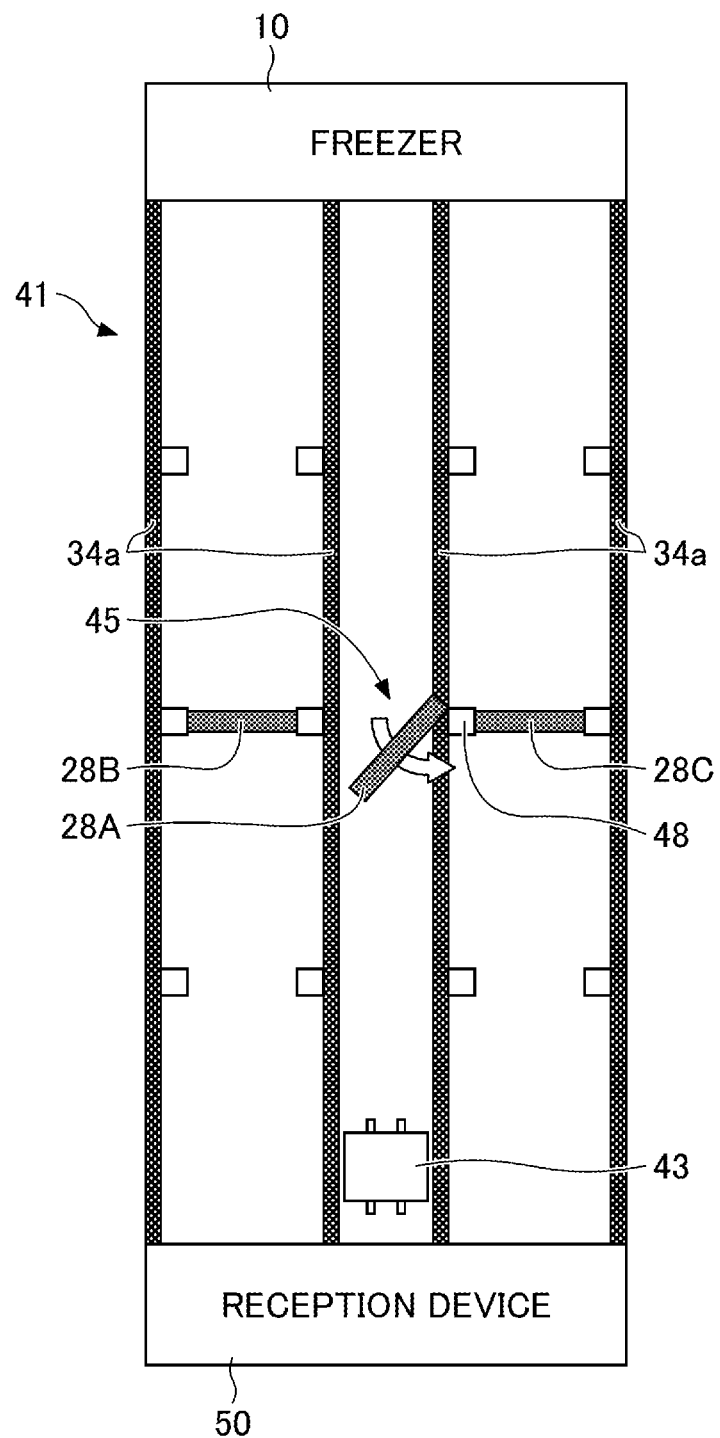
FIG. 21 is a plan view for explaining a third example of a vent opening.

FIG. 21 is a plan view for explaining a third example of the vent opening 45. The partition plate 28A slides to open and close the vent opening 45 formed between two adjacent partition plates 28B and 28C. The partition plate 28A rotates about the hinge 48 on the partition plate 28B side or on the partition plate 28C side. The three partition plates 28A, 28B, and 28C and the hinge 48 move along the horizontal rails 34*a* formed in the ceiling part of the storage chamber 30. The temperature adjustment device 27 moves along the horizontal rails 34*a*, so that it is possible to create environments with different temperatures per room divided by the partition plates 28.

Figure 22:
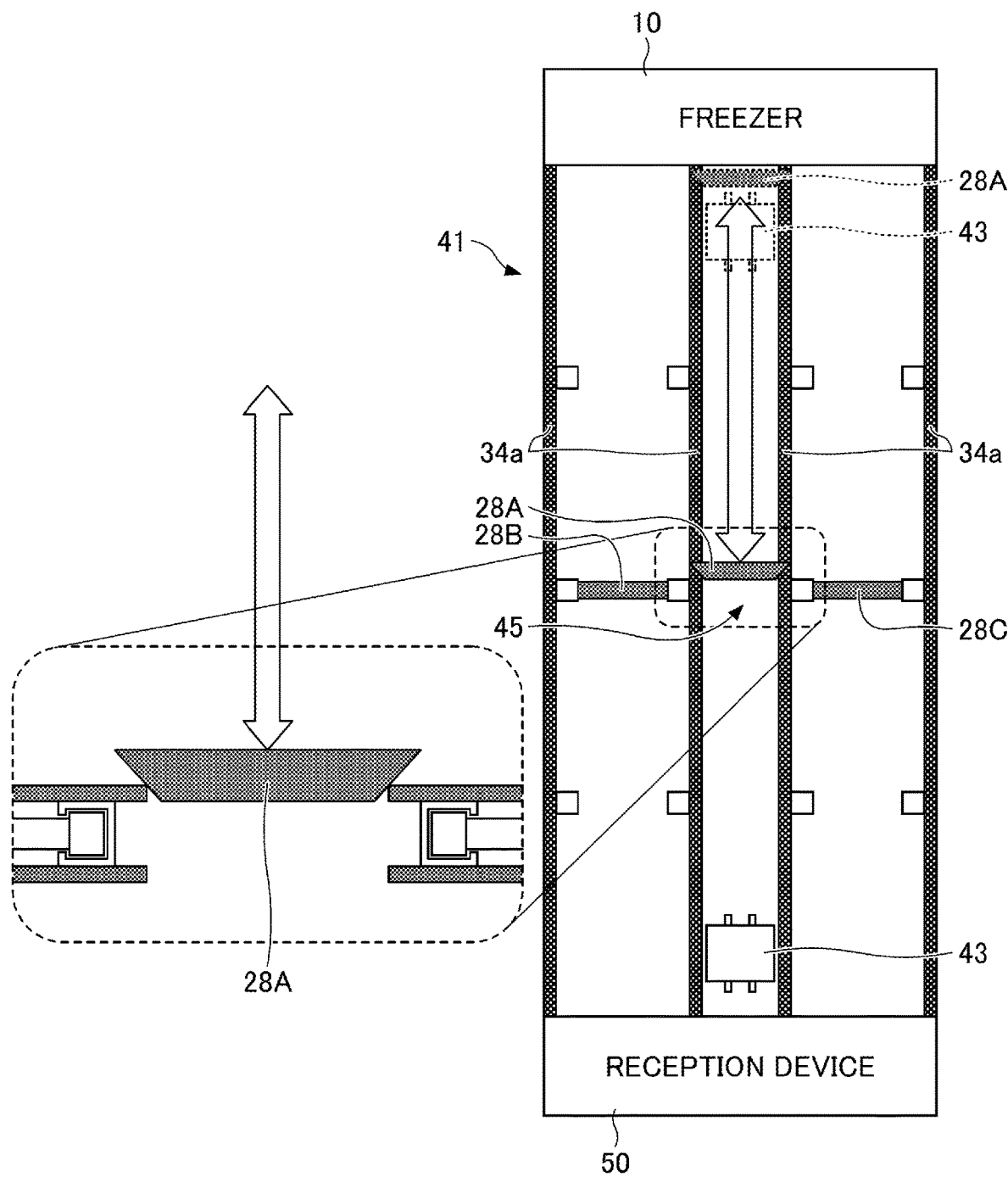
FIG. 22 is a plan view for explaining a fourth example of a vent opening.

FIG. 22 is a plan view for explaining a fourth example of the vent opening 45. The partition plate 28A moves, together with the automatic carrier device 43, to the location of the freezer 10. The partition plate 28A closes the vent opening 45 by moving to the location of the vent opening 45 together with the automatic carrier device 43. The three partition plates 28A, 28B, and 28C move along the horizontal rails 34*a* formed in the ceiling part of the storage chamber 30. The temperature adjustment device 27 moves along the horizontal rails 34*a*, so that it is possible to create environments with different temperatures per room divided by the partition plates 28.

Figure 23:
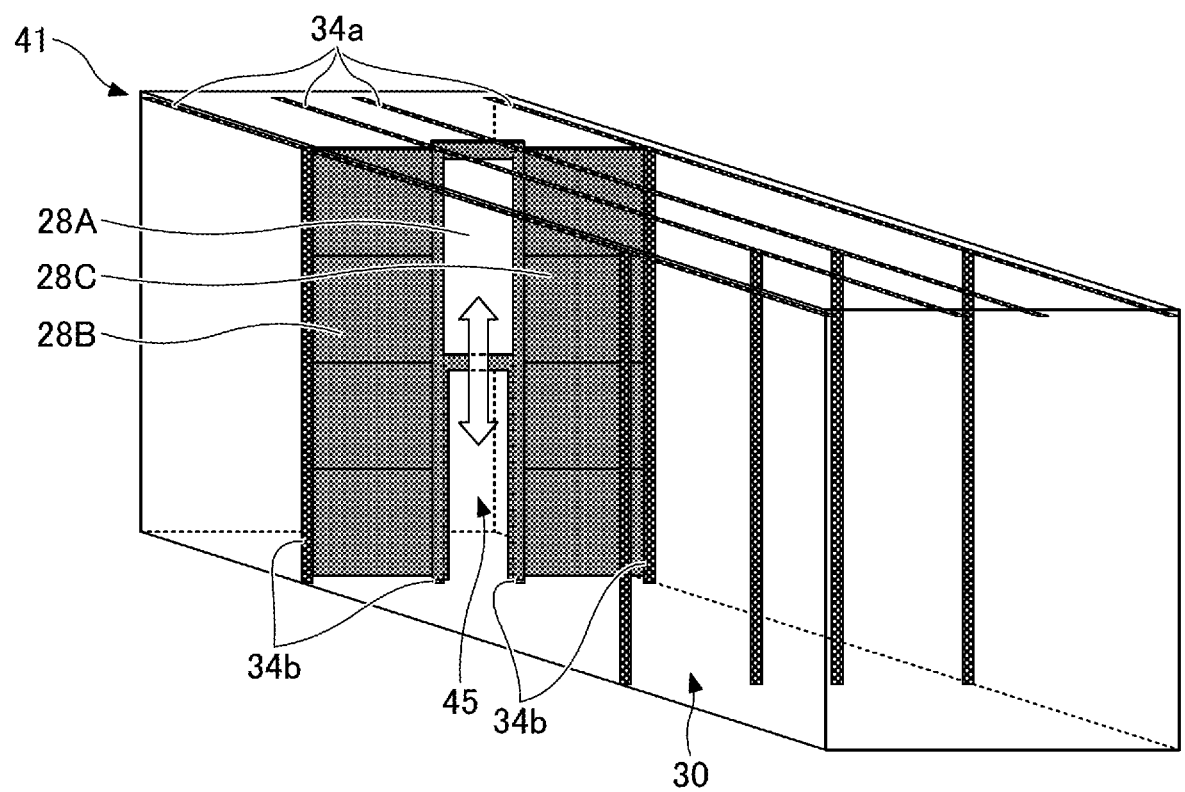
FIG. 23 is a perspective view for explaining a fifth example of a vent opening.

FIG. 23 is a perspective view for explaining a fifth example of the vent opening 45. The partition plate 28A slides such that it opens and closes the vent opening 45 formed between two adjacent partition plates 28B and 28C. The partition plate 28A slides vertically. The three partition plates 28A, 28B, and 28C move along the horizontal rails 34*a* formed in the ceiling part of the storage chamber 30. The temperature adjustment device 27 moves along the horizontal rails 34*a*, so that it is possible to create environments with different temperatures per room divided by the partition plates 28.

Figure 24:
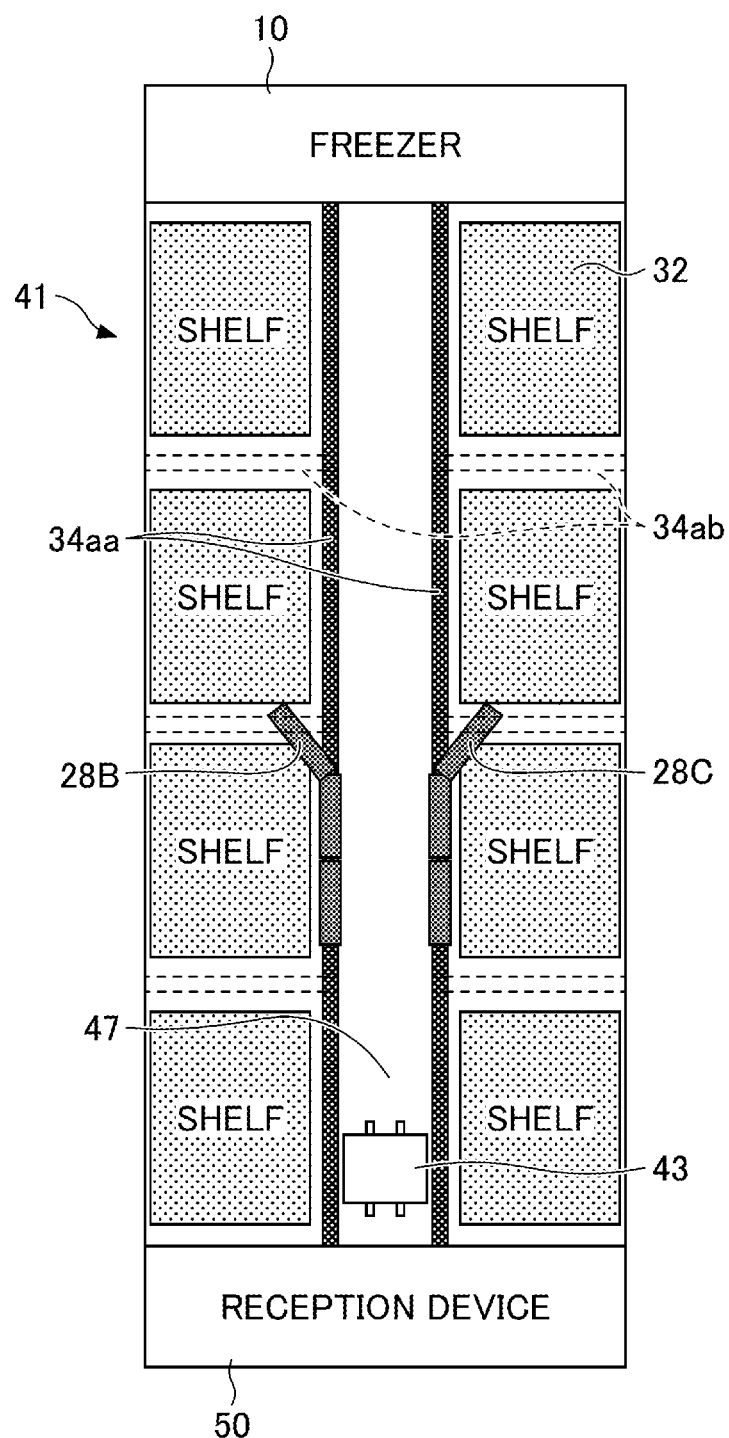
FIG. 24 is a plan view for explaining a traveling path.

FIG. 24 is a plan view for explaining a traveling path 47. The storage 41 has a traveling path 47, on which the automatic carrier device 43 travels. The partition plates 28B and 28C, provided on both sides of the traveling path 47, slide along the traveling path 47, in the longitudinal direction of the storage 41, so as not to hinder the traveling of the automatic carrier device 43 on the traveling path 47. The partition plates 28B and 28C move along the horizontal rails 34*aa* formed in the ceiling part and the floor part of the storage chamber 30. The horizontal rails 34*aa* extend in the longitudinal direction and the and horizontal direction of the storage 41. The partition plates 28B and 28C may slide to move into the spaces formed between the shelves 32 that are adjacent to each other in the longitudinal direction of the storage 41. The partition plates 28B and 28C move along the horizontal rails 34*ab* formed in the ceiling part and the floor part of the storage chamber 30. The horizontal rails 34*ab* extend in the width direction and the horizontal direction of the storage 41. For example, as in FIG. 5, the horizontal rails 34aa and the horizontal rails 34ab are interconnected so as to form T-parts, so that the partition plates 28B and 28C can make turns in their sliding direction with ease. The partition plates 28B and 28C may be accordion curtains. The temperature adjustment device 27 moves along the horizontal rails 34aa, so that it is possible to create environments with different temperatures per room divided by the partition plates 28.

Figure 25:
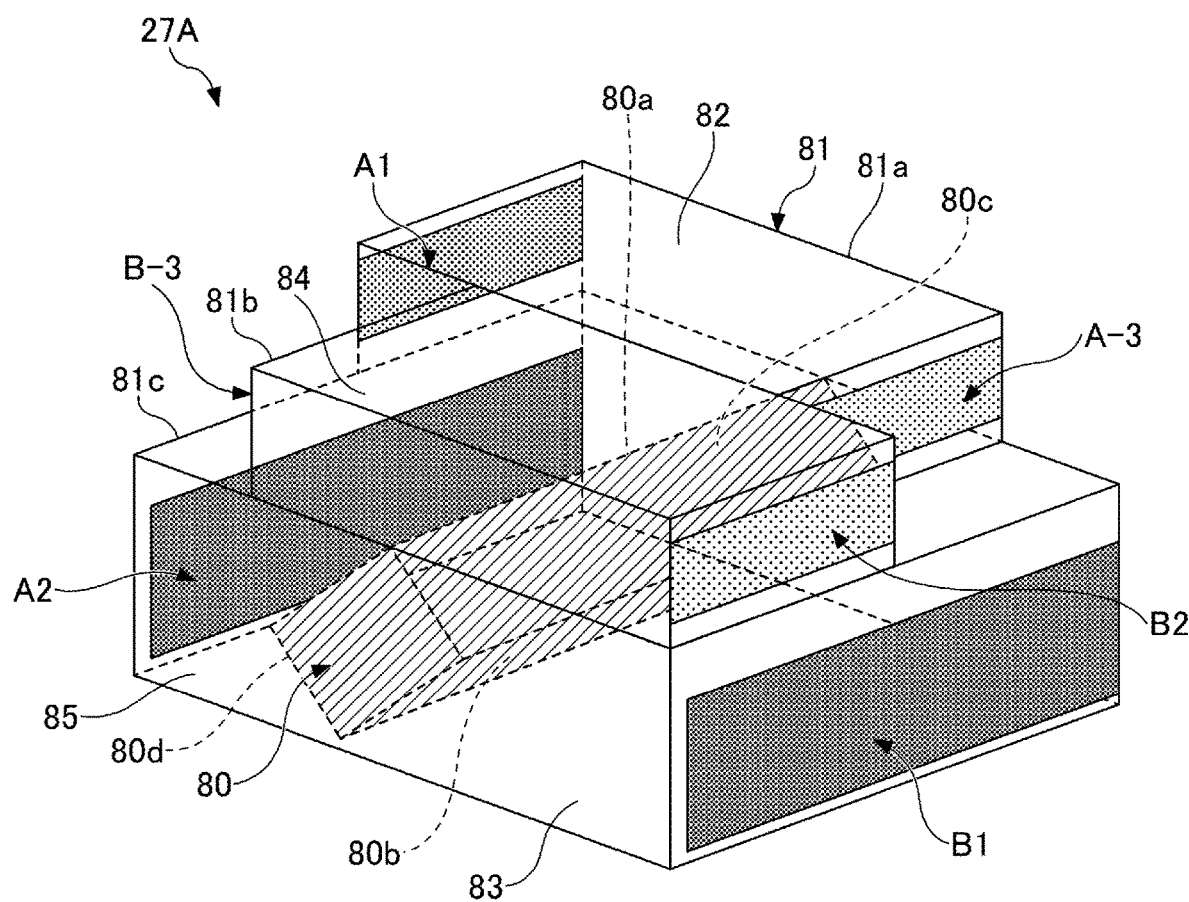
FIG. 25 is a perspective view that shows a first example structure of a temperature adjustment device.

FIG. 25 is a perspective view that shows a first example structure of the temperature adjustment device. A temperature adjustment device 27A is an example of the temperature adjustment device 27 described above. The temperature adjustment device 27A includes a casing 81, in which a heat exchange element 80 is contained. An opening A1, an opening B1, an opening B2, an opening A2, an openable/closable window A-3, and an openable/closable window B-3 are provided in surfaces of the casing 81.

The casing 81 includes multiple casing parts 81a, 81b, and 81c that are approximately rectangular, parallelepiped-shaped. Each of the casing parts B1a, 81b, and 81c may share a dividing wall with the adjoining casing part. The opening A1 and the openable/closable window A-3 are provided in a pair of opposing surfaces of the casing part 81a. The opening B2 and the openable/closable window B-3 are provided in a pair of opposing surfaces of the casing part 81b. The opening B1 and the opening A2 are provided in a pair of opposing surfaces of the casing part 81c. The casing parts B1a and 81b are placed on top of the casing part 81c. The opening B2 and the openable/closable window B-3 of the casing part 81b are offset from the head-on positions with respect to the casing part 81a.

The opening A1, the opening A2, and the openable/closable window B-3 are coupled to the room 190 described above (hereinafter a "storage chamber 1"), and the opening B2, the opening B1, and the openable/closable window A-3 are coupled to the room 140 described above (hereinafter a "storage chamber 2"). An inner chamber 82, an inner chamber 83, an inner chamber 84, and an inner chamber 85 are formed in the inner space of the casing 81. The inner chamber 82, the inner chamber 83, the inner chamber 84, and the inner chamber 85 are separated from adjoining chambers by partition walls.

One end of the inner chamber 82 is coupled to the opening A1, and the other end is coupled to the openable/closable window A-3. One end of the inner chamber 83 is coupled to an element surface 80b of the heat exchange element 80, and the other end is coupled to the opening B1. One end of the inner chamber 84 is coupled to the opening B2, and the other end is coupled to the openable/closable window B-3. One end of the inner chamber 85 is coupled to an element surface 80d of the heat exchange element 80, and the other end is coupled to the opening A2.

The heat exchange element 80 is a rectangular parallelepiped-shaped heat exchanger having element surfaces 80a and 80b that face each other, and element surfaces 80c and 80d that face each other. The heat exchange element 80 includes a first channel that connects between the element surface 80a and the element surface 80b, and a second channel that connects between the element surface 80c and the element surface 80d. The first channel and the second channel intersect each other. The heat exchange element 80 is configured such that heat is exchanged between the air that flows in the first channel and the air that flows in the second channel.

Figure 26:
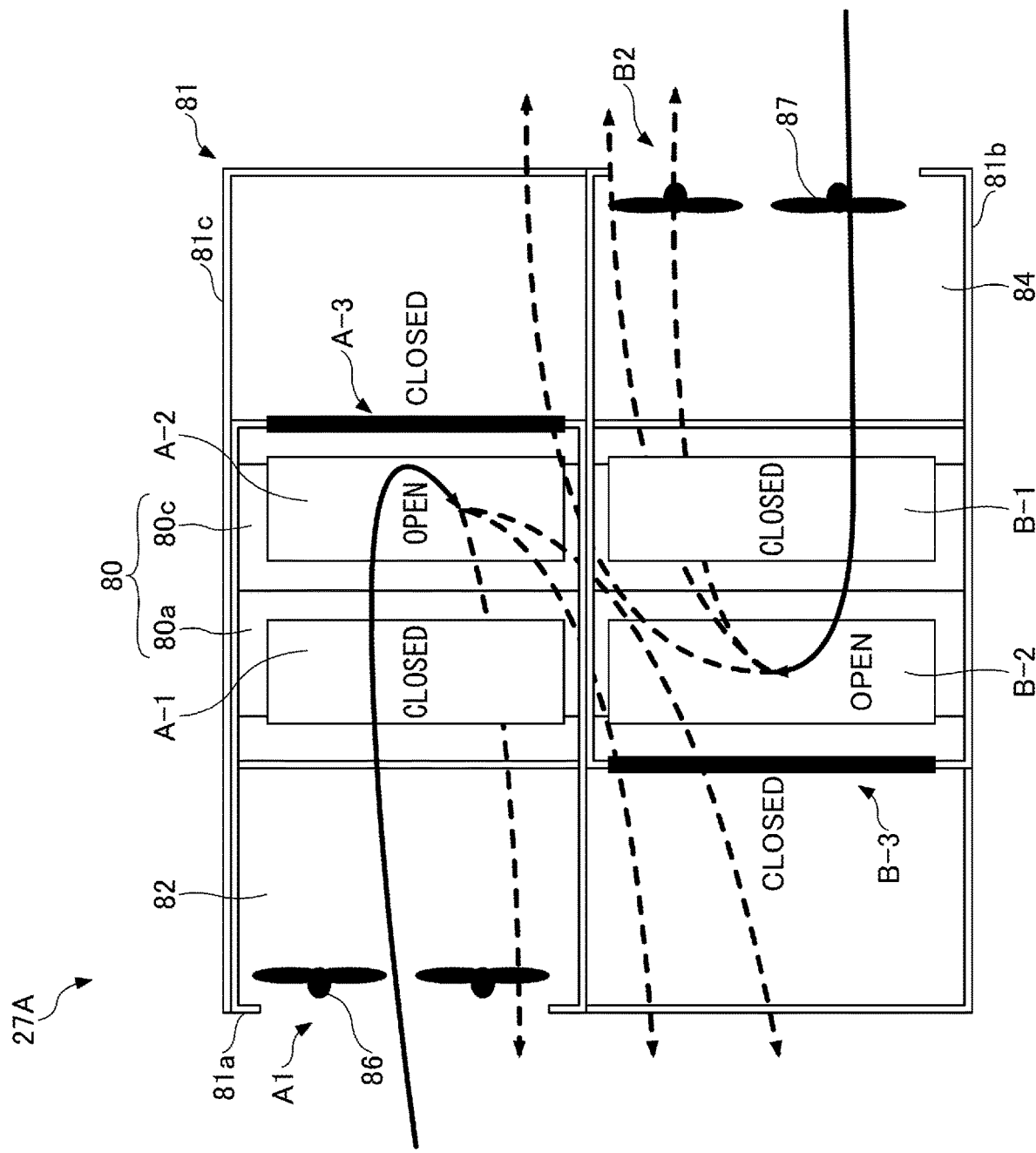
FIG. 26 is a cross-sectional view that shows an example operating state of the temperature adjustment device of the first example structure in a first operating mode, seen from above.
Figure 27:
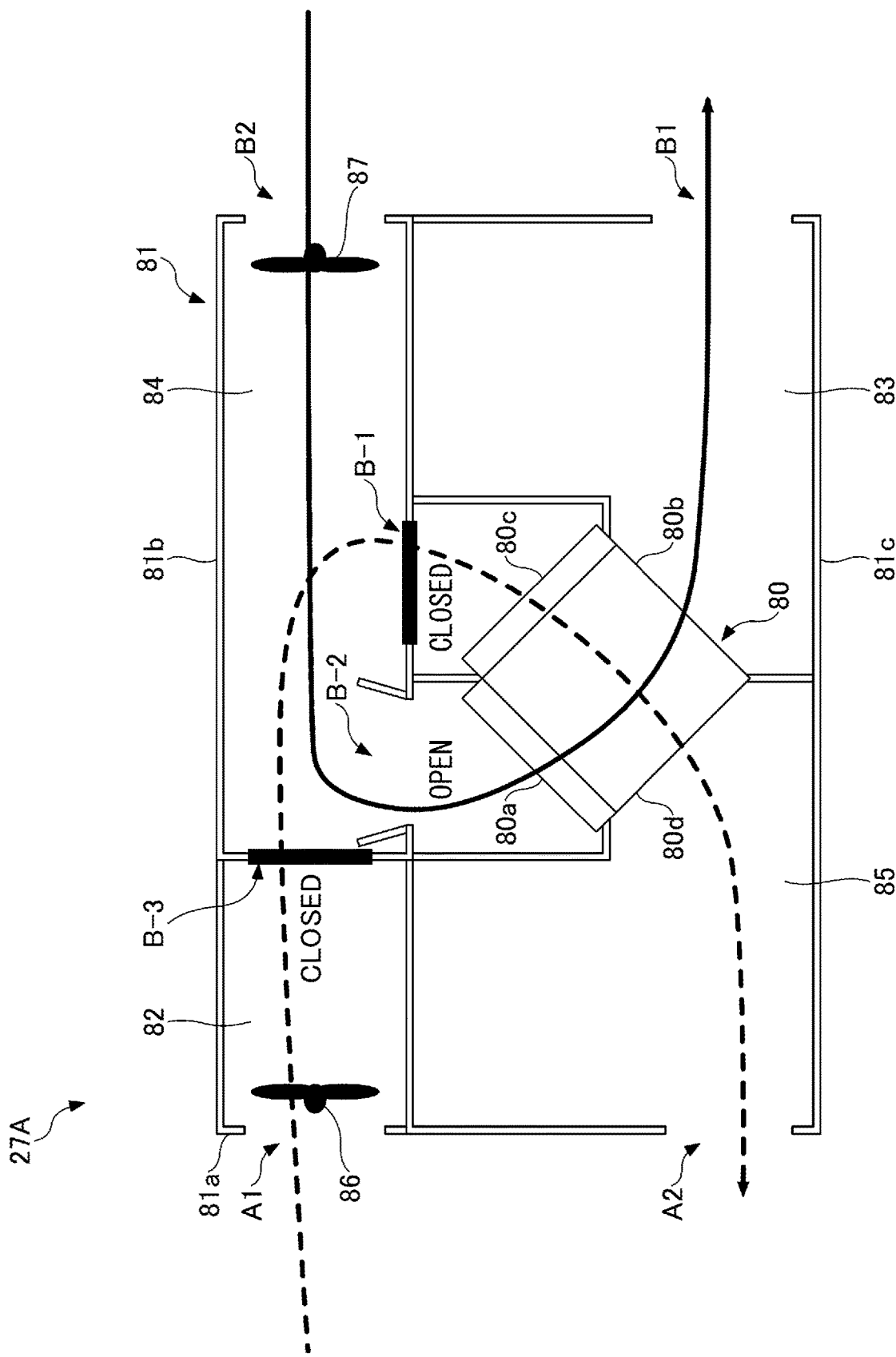
FIG. 27 is a cross-sectional view that shows an example operating state of the temperature adjustment device of the first example structure in the first operating mode, seen from the side.

FIG. 26 is a cross-sectional top view that shows an example operating state of the temperature adjustment device of the first example structure in a first operating mode. FIG. 27 is a cross-sectional view that shows an example operating state of the temperature adjustment device of the first example structure in the first operating mode, seen from the side. An air blower 86, placed in the inner chamber 82, suctions the air in the storage chamber 1 into the inner chamber 82 through the opening A1. An air blower 87, placed in the inner chamber 84, suctions the air in the storage chamber 2 into the inner chamber 84 through the opening B2. In the first example structure, the openings A1 and B2 are used as air suction openings, the openings A2 and B1 are used as blowout openings, the inner chambers 82 and 84 are used as air suction chambers, and the inner chambers 83 and 85 are used as blowout chambers.

The flow and shut-off of air between the inner chamber 82 and the element surface 80a are controlled by opening or closing an openable/closable window A-1. The flow and shut-off of air between the inner chamber 82 and the element surface 80c are controlled by opening or closing an openable/closable window A-2. The flow and shut-off of air between the inner chamber 84 and the element surface 80c are controlled by opening or closing an openable/closable window B-1. The flow and shut-off of air between the inner chamber 84 and the element surface 80a are controlled by opening or closing an openable/closable window B-2.

The controller 17 controls the temperature adjustment device 27A in the first operating mode, in which heat is exchanged between the storage chamber 1 and the storage chamber 2 without flowing air therebetween. In the first operating mode, the controller 17 actuates the air blowers 86 and 87, closes the openable/closable windows A-1, B-1, A-3, and B-3, and opens the openable/closable windows A-2 and B-2. By this means, air from the storage chamber 1 is returned to the storage chamber 1 through a route from the opening A1 to the inner chamber 82, to the openable/closable window A-2, to the element surface 80c, to the element surface 80d, to the inner chamber 85, and to the opening A2. On the other hand, air from the storage chamber 2 is returned to the storage chamber 2 through a route from the opening B2 to the inner chamber 84, to the openable/closable window B-2, to the element surface 80a, to the element surface 80b, to the inner chamber 83, and to the opening B1. Thus, heat is exchanged between the storage chamber 1 and the storage chamber 2 without flowing air therebetween, so that it is possible to prevent dew from forming in the storage chamber 1, which has the lower temperature between the storage chamber 1 and the storage chamber 2.

Figure 28:
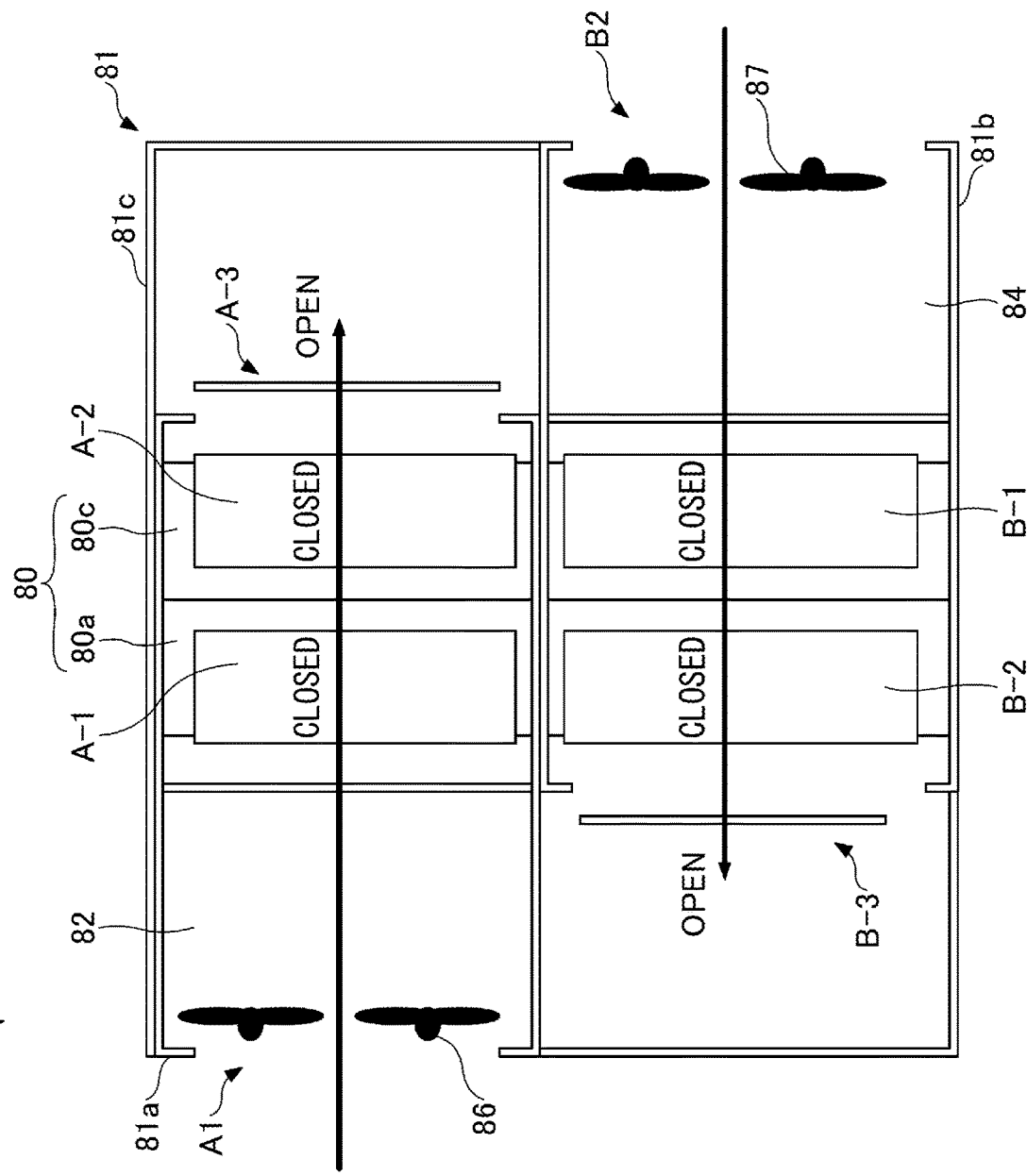
FIG. 28 is a cross-sectional view that shows an example operating state of the temperature adjustment device of the first example structure in a second operating mode, seen from above.
Figure 29:
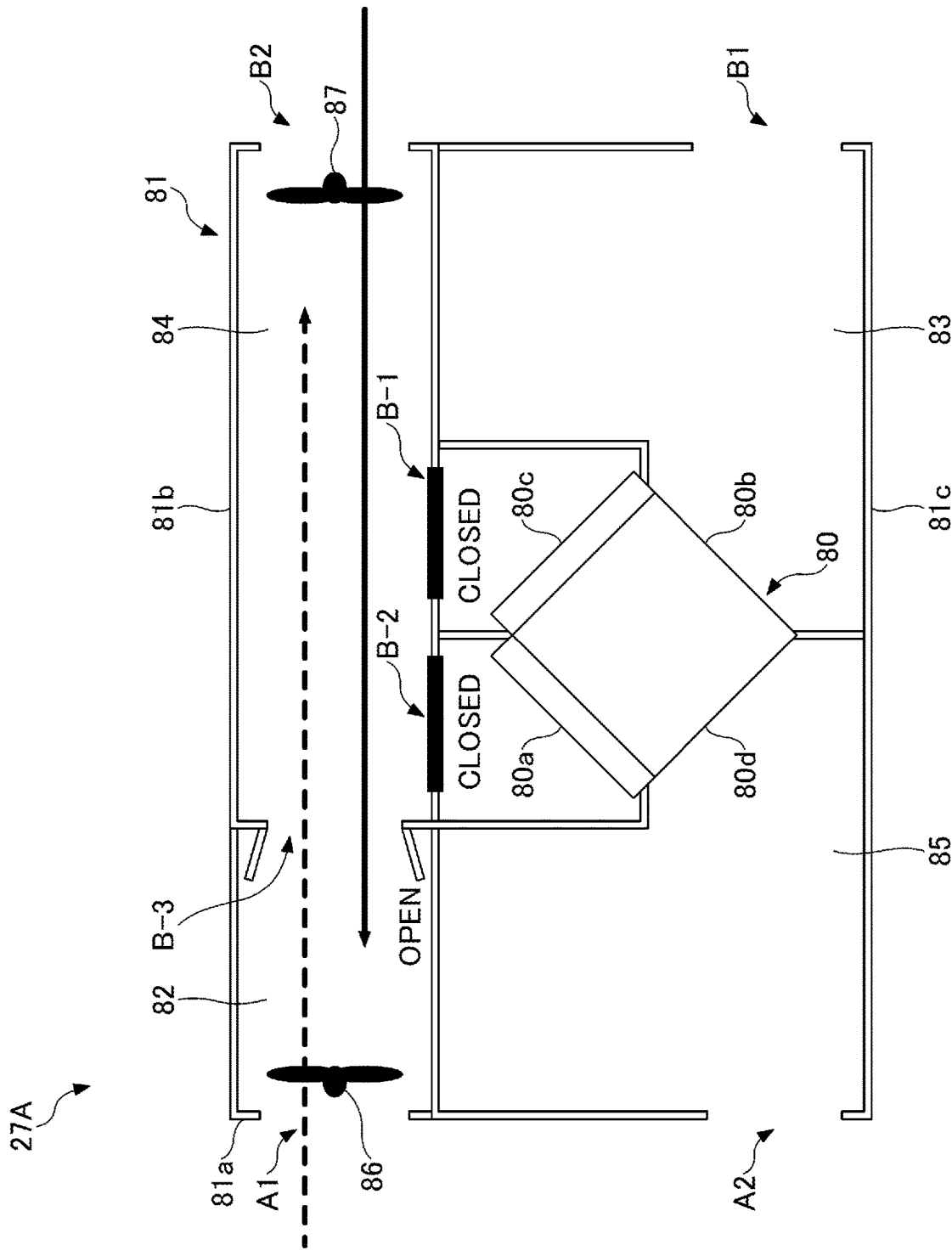
FIG. 29 is a cross-sectional view that shows an example operating state of the temperature adjustment device of the first example structure in the second operating mode, seen from the side.

FIG. 28 is a cross-sectional top view that shows an example operating state of the temperature adjustment device of the first example structure in a second operating mode. FIG. 29 is a cross-sectional view that shows an example operating state of the temperature adjustment device of the first example structure in the second operating mode, seen from the side.

The controller 17 controls the temperature adjustment device 27A in the second operating mode, in which heat is exchanged between the storage chamber 1 and the storage chamber 2 by flowing air therebetween. In the second operating mode, the controller 17 actuates the air blowers 86 and 87, closes the openable/closable windows A-1, A-2, B-1, and B-2, and opens the openable/closable windows A-3 and B-3. By this means, air from the storage chamber 1 is supplied to the storage chamber 2 through a route from the opening A1, to the inner chamber 82, and to the openable/ closable window A-3. On the other hand, air from the storage chamber 2 is supplied to the storage chamber 1 through a route from the opening B2, to the inner chamber 84, and to the openable/closable window B-3. By means of this control, it is possible to exchange heat between the storage chamber 1 and the storage chamber 2 by flowing air therebetween, without making air bypass the heat exchange element 80. This makes it possible to directly supply the air in the storage chamber 1, which has the lower temperature between the storage chamber 1 and the storage chamber 2, to the storage chamber 2, which has the higher temperature, so that the storage chamber 2 can be cooled quickly.

For example, in response to a rise in the concentration of carbon dioxide or ethylene in the storage chamber 1 or the storage chamber 2, the controller 17 controls the temperature adjustment device 27A in the second operating mode. This makes it possible to reduce the concentration of carbon dioxide or ethylene in the storage chamber, in which the concentration of carbon dioxide or ethylene has risen, between the storage chamber 1 and the storage chamber 2. Consequently, it is possible to prevent troubles due to increased concentration of carbon dioxide, or prevent excessive aging of fresh food due to increased concentration of ethylene.

Figure 30:
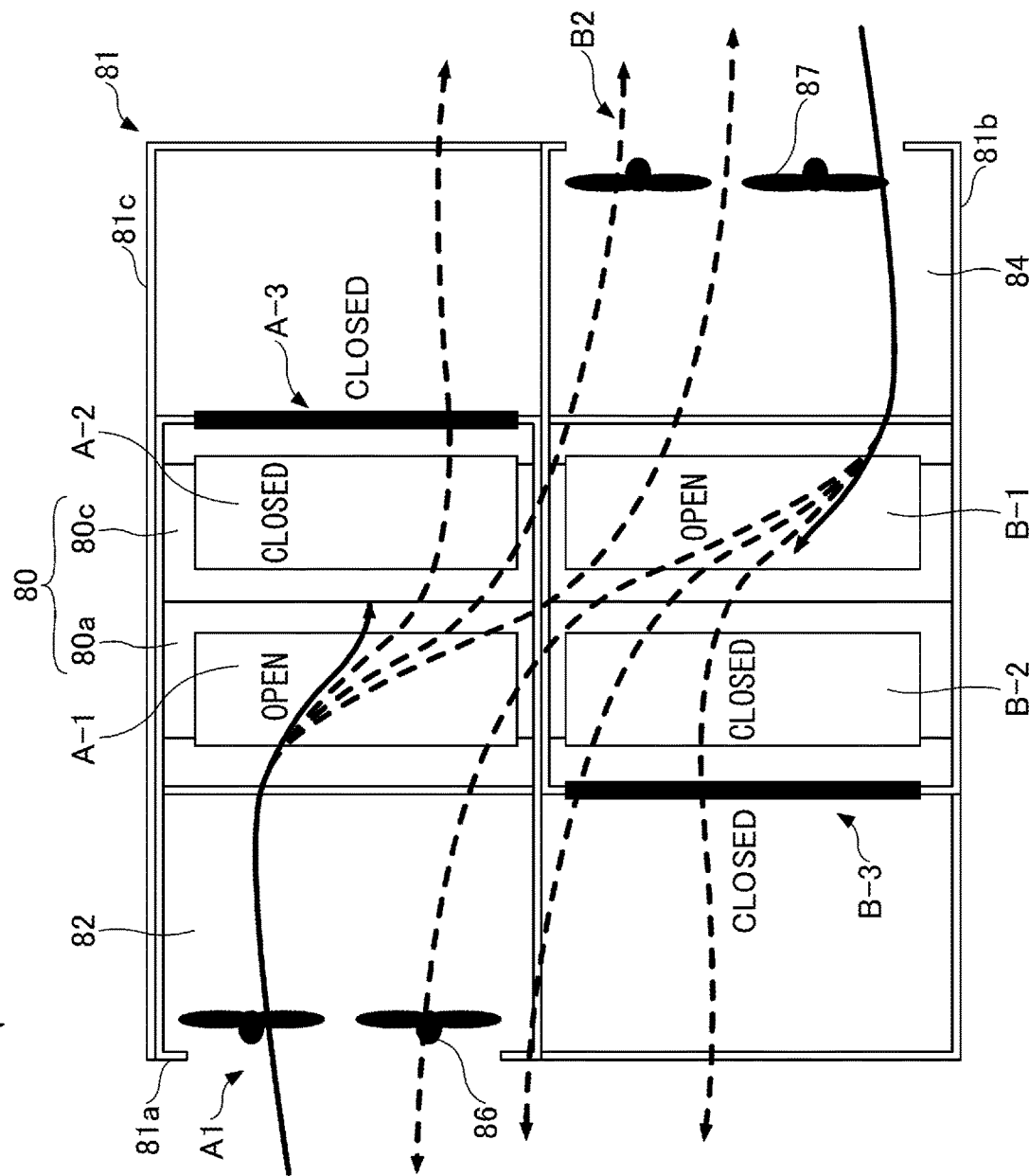
FIG. 30 is a cross-sectional view that shows an example operating state of the temperature adjustment device of the first example structure in a third operating mode, seen from above.
Figure 31:
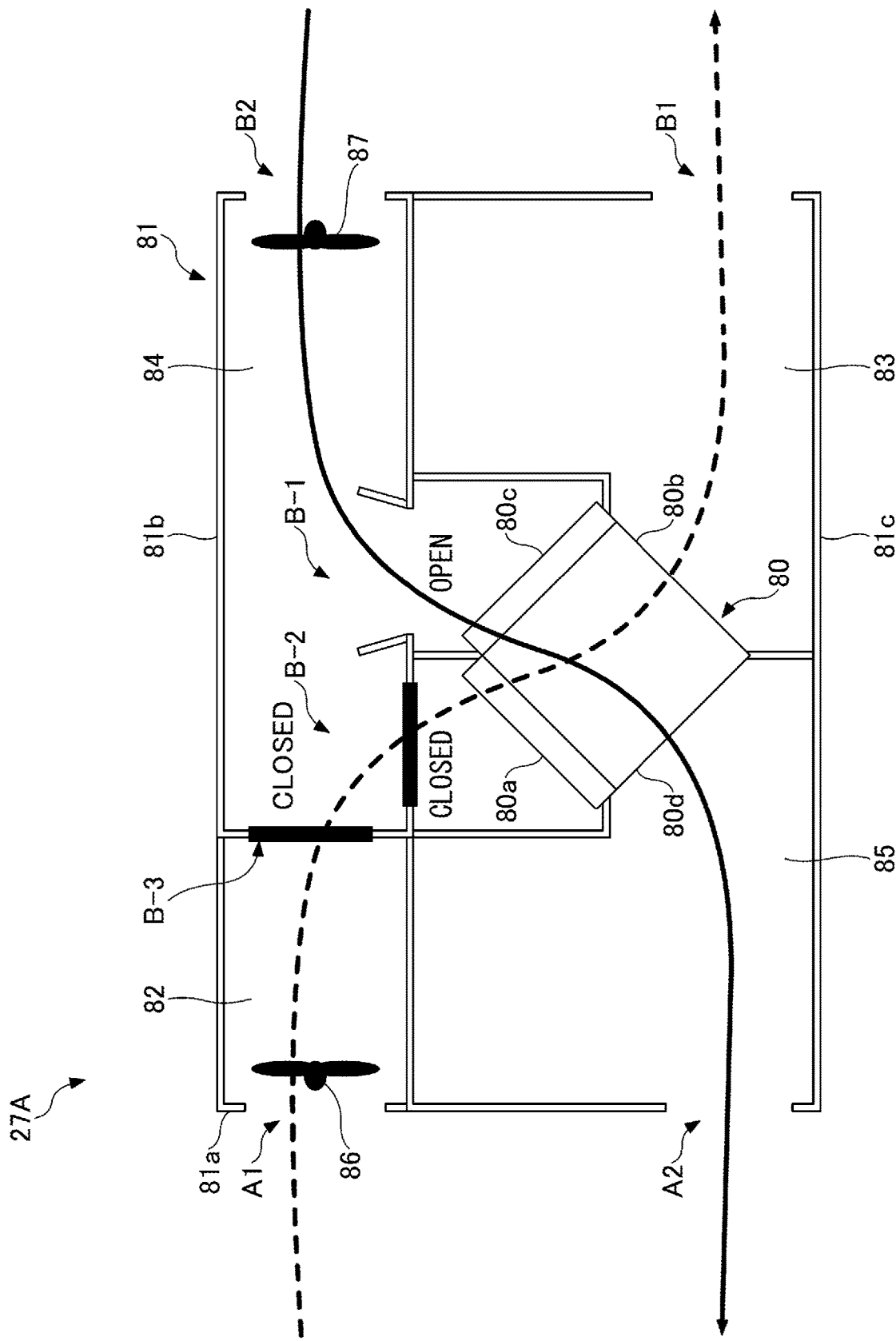
FIG. 31 is a cross-sectional view that shows an example operating state of the temperature adjustment device of the first example structure in the third operating mode, seen from the side.

FIG. 30 is a cross-sectional top view that shows an example operating state of the temperature adjustment device of the first example structure in a third operating mode. FIG. 31 is a cross-sectional view that shows an example operating state of the temperature adjustment device of the first example structure in the third operating mode, seen from the side.

The controller 17 controls the temperature adjustment device 27A in the third operating mode, in which air flows between the storage chamber 1 and the storage chamber 2, while preventing transfer of heat therebetween. In the third operating mode, the controller 17 actuates the air blowers 86 and 87, closes the openable/closable windows A-2, A-3, B-2, and B-3, and opens the openable/closable windows A-1 and B-1. By this means, air from the storage chamber 1 is supplied to the storage chamber 2 through a route from the opening A1, to the inner chamber 82, to the openable/closable window A-1, to the element surface 80a, to the element surface 80b, to the inner chamber 83, and to the opening B1. On the other hand, air from the storage chamber 2 is supplied to the storage chamber 1 through a route from the opening B2, to the inner chamber 84, to the openable/closable window B-1, to the element surface 80c, to the element surface 80d, to the inner chamber 85, and to the opening A2. By means of this control, it is possible to exchange heat between the storage chamber 1 and the storage chamber 2 by flowing air therebetween, without making air bypass the heat exchange element 80. By this means, it is possible to circulate air between the storage chamber 1 and the storage chamber 2 while preventing temperature changes in both the storage chamber 1 and the storage chamber 2.

Figure 32:
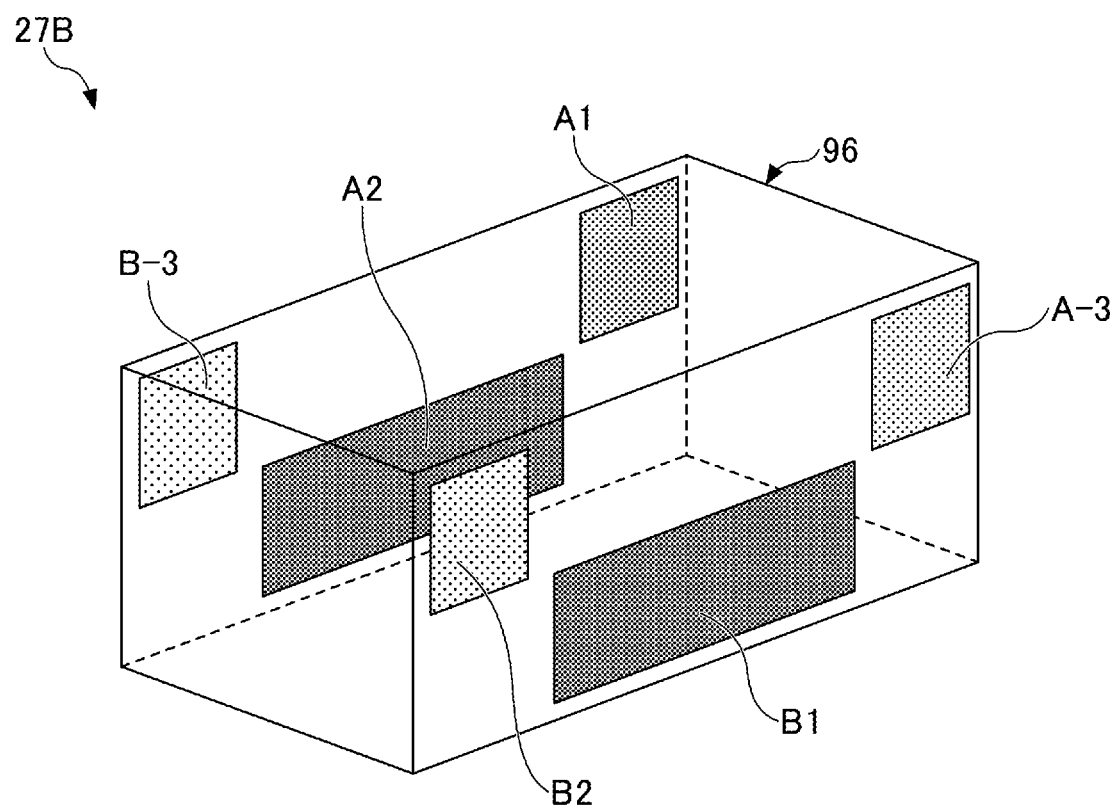
FIG. 32 is a perspective view that shows a second example structure of a temperature adjustment device.

FIG. 32 is a perspective view that shows a second example structure of the temperature adjustment device. A temperature adjustment device 27B is an example of the temperature adjustment device 27 described above, and is made smaller than the temperature adjustment device 27A. The temperature adjustment device 27B includes an approximately rectangular parallelepiped-shaped casing 96, in which a heat exchange element 80 (not shown in FIG. 32) is contained. An opening A1, an opening B1, an opening B2, an opening A2, an openable/closable window A-3, and an openable/closable window B-3 are provided in surfaces of the casing 96.

Given a pair of opposing surfaces of the casing 96, the opening A1, the opening A2, and the openable/closable window B-3 are provided in one surface, and the opening B2, the opening B1, and the openable/closable window A-3 are provided in the other surface. The opening A1, the opening A2, and the openable/closable window B-3 are coupled to the storage chamber 1, and the opening B2, the opening B1, and the openable/closable window A-3 are coupled to the storage chamber 2.

Figure 33:
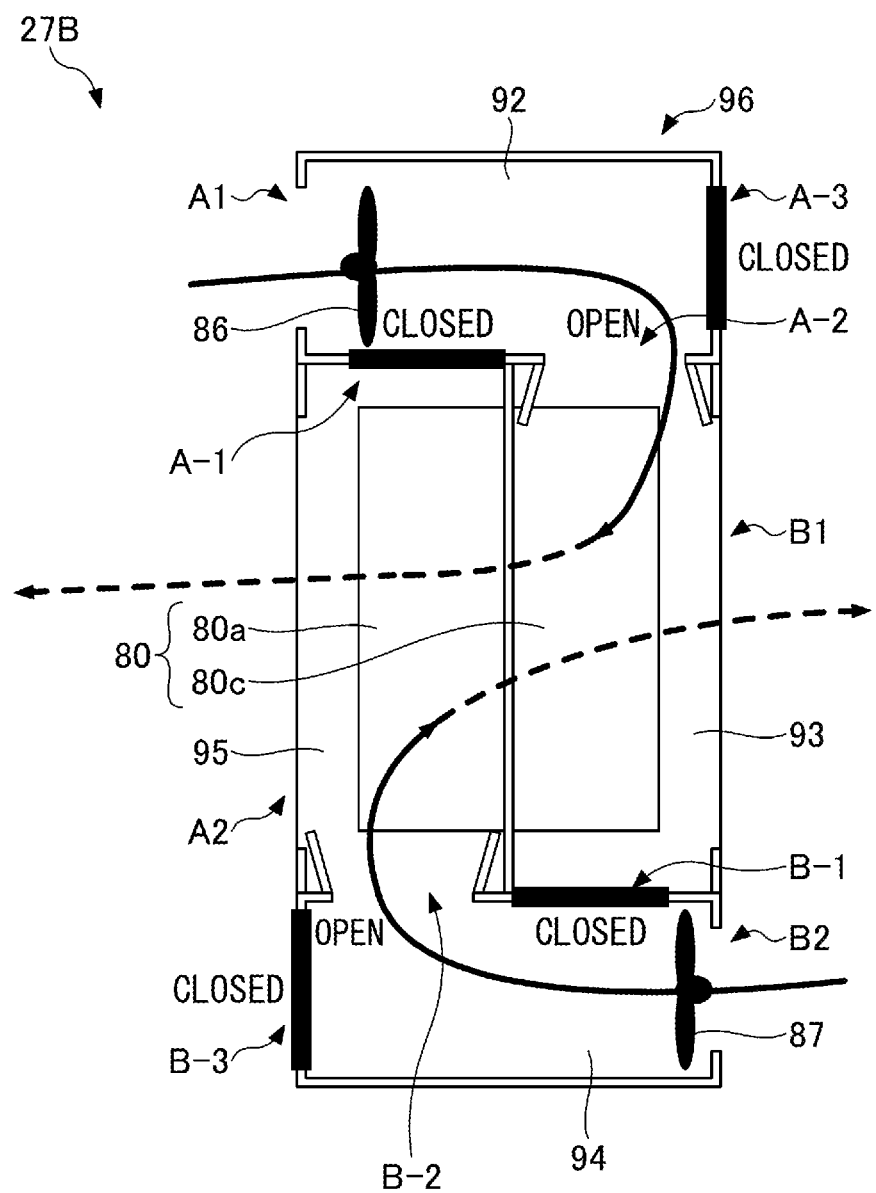
FIG. 33 is a cross-sectional view that shows an example operating state of the temperature adjustment device of the second example structure in a first operating mode, seen from above.
Figure 34:
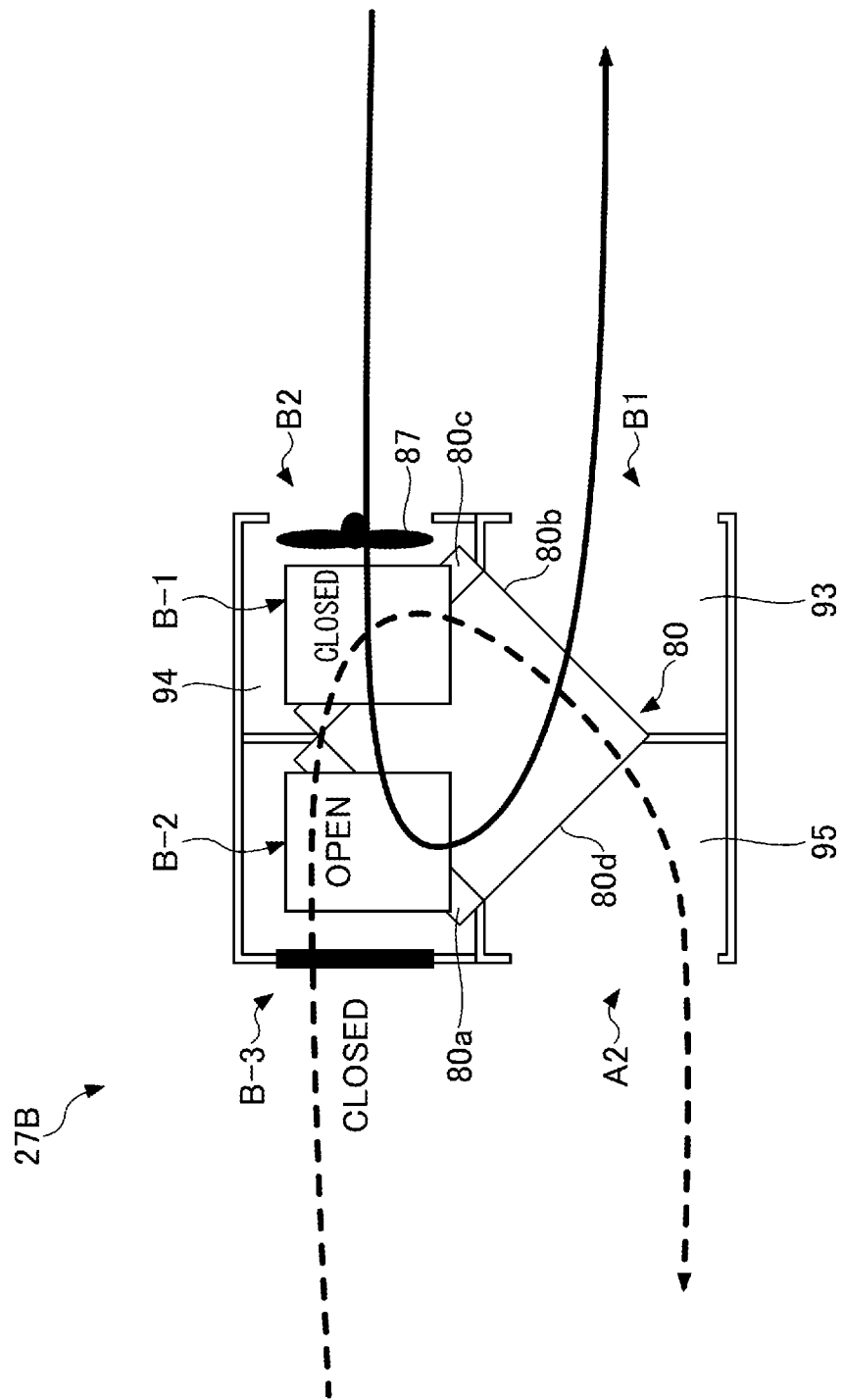
FIG. 34 is a cross-sectional view that shows an example operating state of the temperature adjustment device of the second example structure in the first operating mode, seen from the side.

FIG. 33 is a cross-sectional top view that shows an example operating state of the temperature adjustment device of the second example structure in the first operating mode. FIG. 34 is a cross-sectional view that shows an example operating state of the temperature adjustment device of the second example structure in the first operating mode, seen from the side. An inner chamber 92, an inner chamber 93, an inner chamber 94, and an inner chamber 95 are formed in the inner space of the casing 96. The inner chamber 92, the inner chamber 93, the inner chamber 94, and the inner chamber 95 are separated from adjoining chambers by partition walls. In the second example structure, the openings A1 and B2 are used as air suction openings, the openings A2 and B1 are used as blowout openings, the inner chambers 92 and 94 are used as air suction chambers, and the inner chambers 93 and 95 are used as blowout chambers.

One end of the inner chamber 92 is coupled to the opening A1, and the other end is coupled to the openable/closable window A-3. One end of the inner chamber 93 is coupled to an element surface 80b of the heat exchange element 80, and the other end is coupled to the opening B1. One end of the inner chamber 94 is coupled to the opening B2, and the other end is coupled to the openable/closable window B-3. One end of the inner chamber 95 is coupled to an element surface 80d of the heat exchange element 80, and the other end is coupled to the opening A2.

The flow and shut-off of air between the inner chamber 92 and the element surface 80a are controlled by opening or closing an openable/closable window A-1. The flow and shut-off of air between the inner chamber 92 and the element surface 80c are controlled by opening or closing an openable/closable window A-2. The flow and shut-off of air between the inner chamber 94 and the element surface 80c are controlled by opening or closing an openable/closable window B-1. The flow and shut-off of air between the inner chamber 94 and the element surface 80a are controlled by opening or closing an openable/closable window B-2.

The controller 17 controls the temperature adjustment device 27B in the first operating mode, in which heat is exchanged between the storage chamber 1 and the storage chamber 2 without flowing air therebetween. In the first operating mode, the controller 17 actuates air blowers 86 and 87, closes the openable/closable windows A-1, B-1, A-3, and B-3, and opens the openable/closable windows A-2 and B-2. By this means, air from the storage chamber 1 is returned to the storage chamber 1 through a route from the opening A1 to the inner chamber 92, to the openable/closable window A-2, to the element surface 80c, to the element surface 80d, to the inner chamber 95, and to the opening A2. On the other hand, air from the storage chamber 2 is returned to the storage chamber 2 through a route from the opening B2 to the inner chamber 94, to the openable/closable window B-2, to the element surface 80a, to the element surface 80b, to the inner chamber 93, and to the opening B1. Consequently, heat is exchanged between the storage chamber 1 and the storage chamber 2 without flowing air therebetween, so that it is possible to prevent dew from forming in the storage chamber 1, which has the lower temperature between the storage chamber 1 and the storage chamber 2.

In this way, like the temperature adjustment device 27A, the temperature adjustment device 27B can operate in the first operating mode. Like the temperature adjustment device 27A, the temperature adjustment device 27B can operate in the second operating mode and the third operating mode. As to the detailed description of these modes, reference should be made to the description of the temperature adjustment device 27A given hereinbefore.

Figure 35:
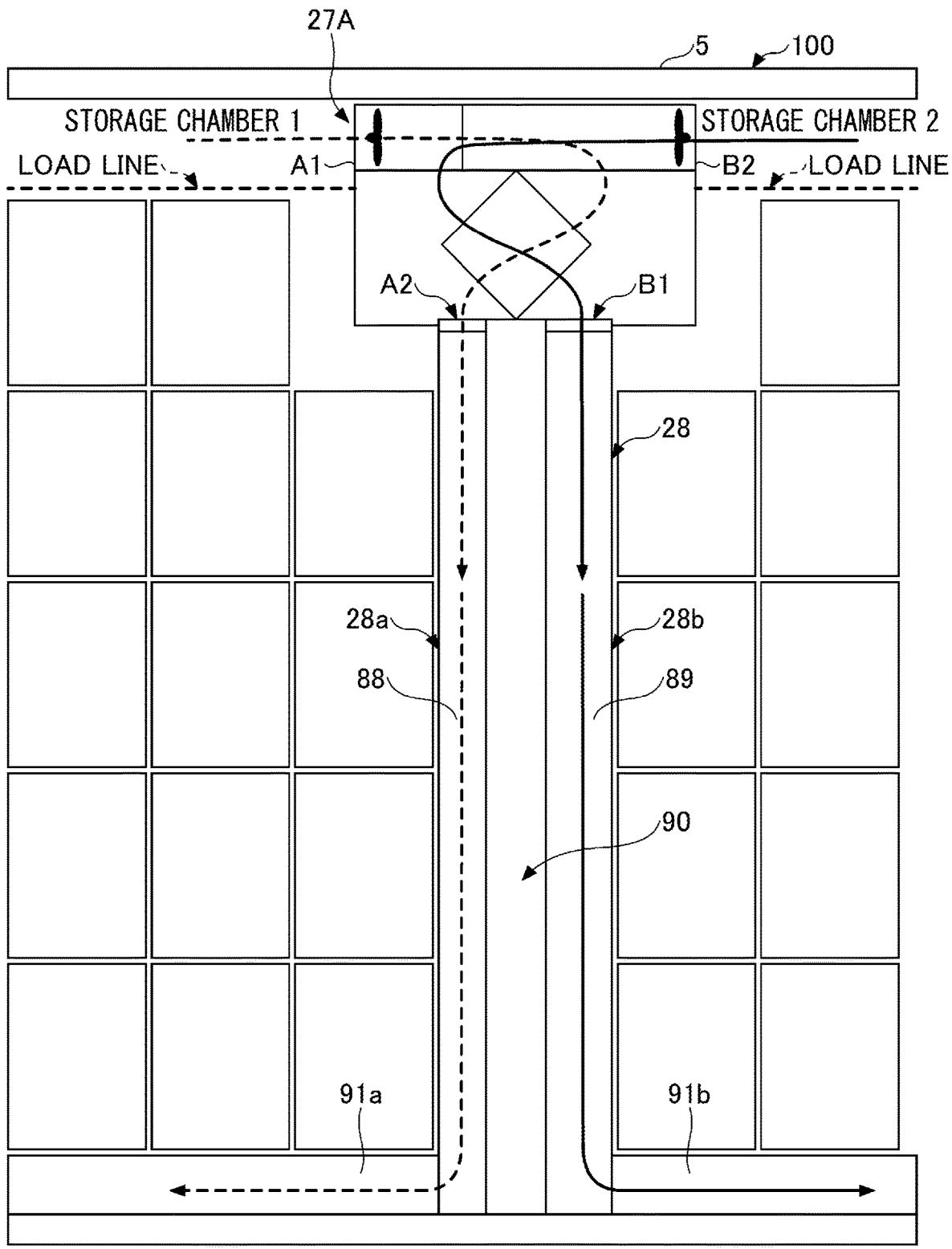
FIG. 35 is a cross-sectional view that shows an example of a vent opening for flowing air from an upper part of the storage to a bottom part of the storage, seen from the side.

FIG. 35 is a cross-sectional view that shows vent paths in which air flows from an upper part of the storage to the bottom part of the storage, seen from the side. The temperature adjustment device 27A is placed above the partition wall 28. The partition wall 28 include a heat-insulating material 90, and vent paths 88 and 89. The heat-insulating material 90 is a core material that prevents transfer of heat between the storage chamber 1 and the storage chamber 2 via the partition wall 28. The partition wall 28 has a partition surface 28a, which is a wall surface opposing the storage chamber 1, and a partition surface 28b, which is a wall surface opposing the storage chamber 2. The vent path 88 is a channel that is formed between the partition surface 28a and the heat-insulating material 90, and that allows air to flow along the partition surface 28a. The vent path 89 is a channel that is formed between the partition surface 28b and the heat-insulating material 90, and that allows air to flow along the partition surface 28b.

Air blown out from the opening A2 of the temperature adjustment device 27A flows into the vent path 88 from the upper end of the vent path 88, and flows out of the lower end of the vent path 88 toward a bottom channel 91a. The bottom channel 91a is a channel formed in the floor of the storage chamber 1. Air blown out from the opening B1 of the temperature adjustment device 27A flows into the vent path 89 from the upper end of the vent path 89, and flows out of the lower end of the vent path 89 toward a bottom channel 91b. The bottom channel 91b is a channel formed in the floor of the storage chamber 2. The bottom channels 91a and 91b are air channels formed at the bottom of the storage 100 and the storage 41, and are, for example, a T-rail that is shaped in the form the letter T, a drainboard part, or a pallet part. The temperature adjustment device 27A illustrated in FIG. 35 is only different from the configuration illustrated in FIG. 27 in the positions of the openings A2 and B1.

The opening A1 is open to the upper space of the storage chamber 1 so that the air in the upper space of the storage chamber 1 can be sucked in. The upper space of the storage chamber 1 refers to, for example, the space above the load line of the storage chamber 1. The opening B2 is open to the upper space of the storage chamber 2 so that the air in the upper space of the storage chamber 2 can be sucked in. The upper space of the storage chamber 2 refers to, for example, the space above the load line of the storage chamber 2. A load line is the maximum height goods can be stored.

The vent path 88 allows the air in the bottom channel 91a formed at the bottom of the storage 100 or the storage 41 and the air in the upper part of the storage, above the load line of the storage chamber 1, to circulate. By this means, it is possible to prevent the temperature in the storage chamber 1 from varying between the upper part and the lower part. The vent path 89 allows the air in the bottom channel 91b formed at the bottom of the storage 100 and the storage 41 and the air in the storage upper part above the load line of the storage chamber 2 to circulate. By this means, it is possible to prevent the temperature in the storage chamber 2 from varying between the upper part and the lower part.

Figure 36:
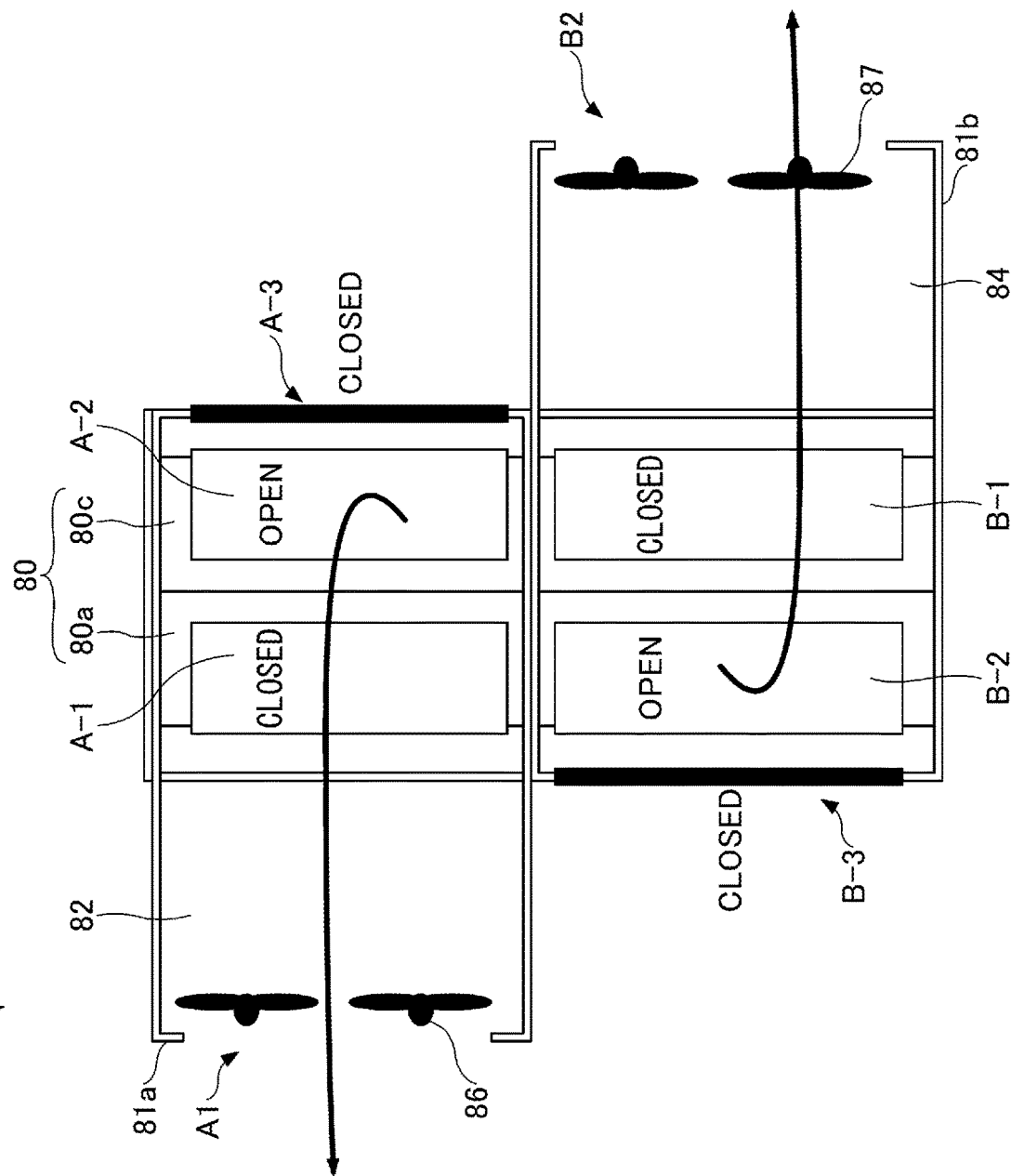
FIG. 36 is a cross-sectional view that shows an example operating state of the temperature adjustment device of the third example structure in the first operating mode, seen from above.
Figure 37:
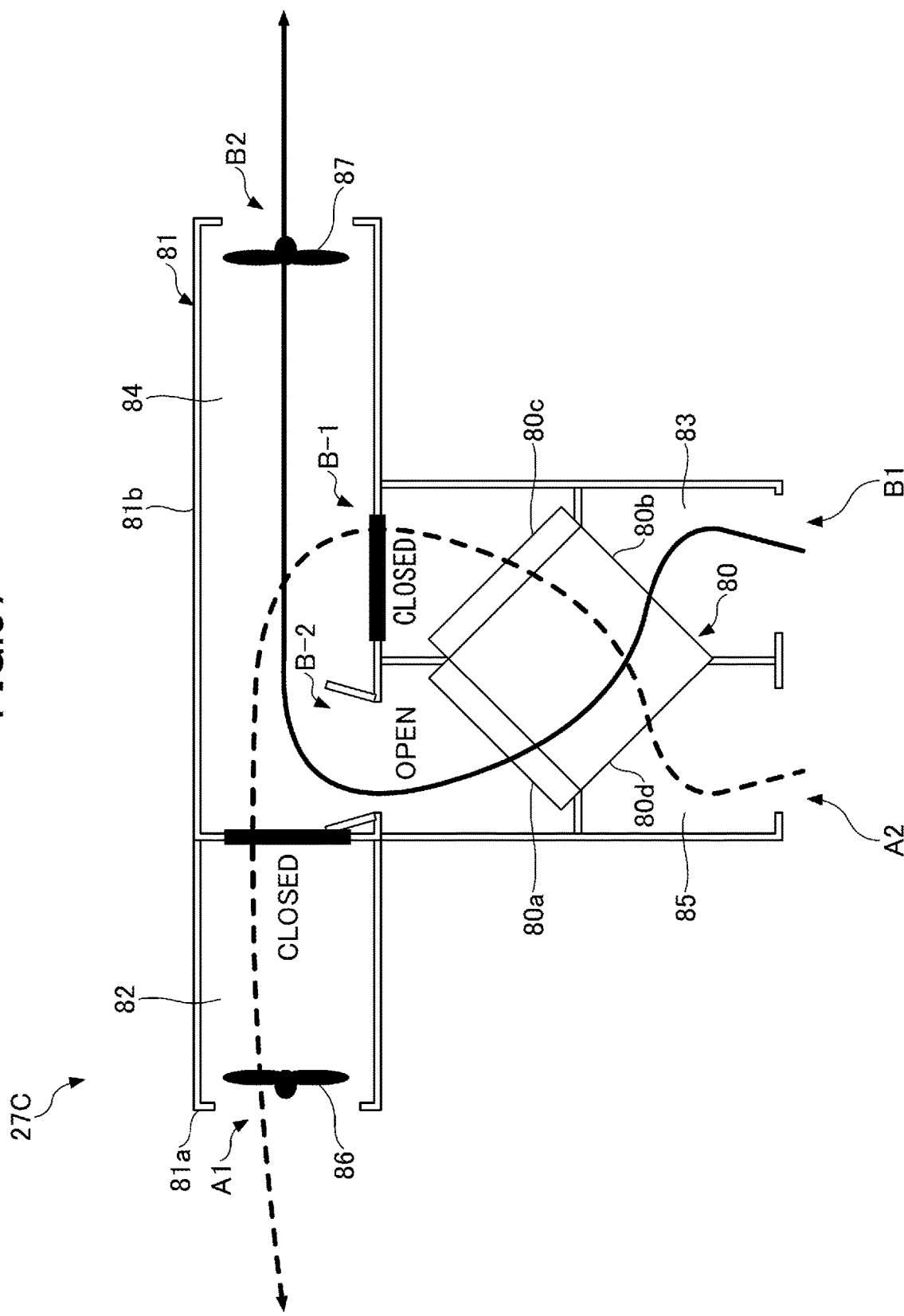
FIG. 37 is a cross-sectional view that shows an example operating state of the temperature adjustment device of the third example structure in the first operating mode, seen from the side.

FIG. 36 is a cross-sectional top view that shows an example operating state of the temperature adjustment device of a third example structure in the first operating mode. FIG. 37 is a cross-sectional view that shows an example operating state of the temperature adjustment device of the third example structure in the first operating mode, seen from the side. The temperature adjustment device 27C illustrated in FIG. 36 and FIG. 37 is a modified example of the temperature adjustment device 27A described above. The temperature adjustment device 27C is structured to suction air from the lower side, and blow out air from the side. Reference should be made to the description given hereinbefore.

The controller 17 controls the temperature adjustment device 27C in the first operating mode, in which heat is exchanged between the storage chamber 1 and the storage chamber 2, without flowing air therebetween. In the first operating mode of the third example structure, openings A1 and B2 are used as blowout openings, openings A2 and B1 are used as air suction openings, inner chambers 82 and 84 are used as blowout chambers, and inner chambers 83 and 85 are used as air suction chambers. That is, the air suction and blowout in the first operating mode of the third example structure are reversed from the first operating mode of the first example structure. Consequently, as illustrated in FIG. 37, air from the storage chamber 1 is returned to the storage chamber 1 through a reversed route of the route illustrated in FIG. 27 and air from the storage chamber 2 is returned to the storage chamber 2 through a reversed route of the route illustrated in FIG. 27 As a result this, heat is exchanged between the storage chamber 1 and the storage chamber 2 without flowing air therebetween, so that it is possible to prevent dew from forming in the storage chamber 1, which has the lower temperature between the storage chamber 1 and the storage chamber 2.

Figure 38:
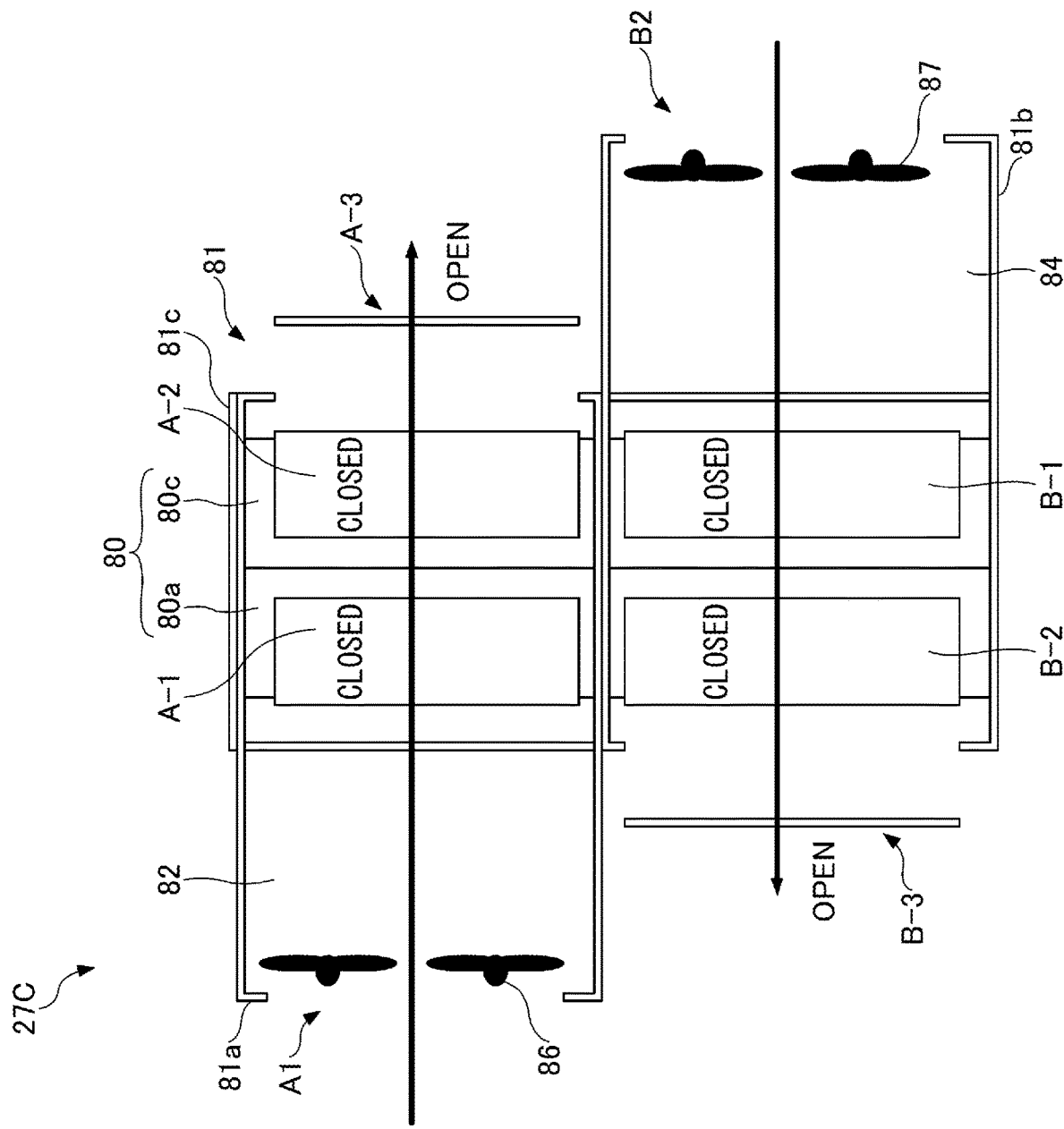
FIG. 38 is a cross-sectional view that shows an example operating state of the temperature adjustment device of the third example structure in a second operating mode, seen from above.
Figure 39:
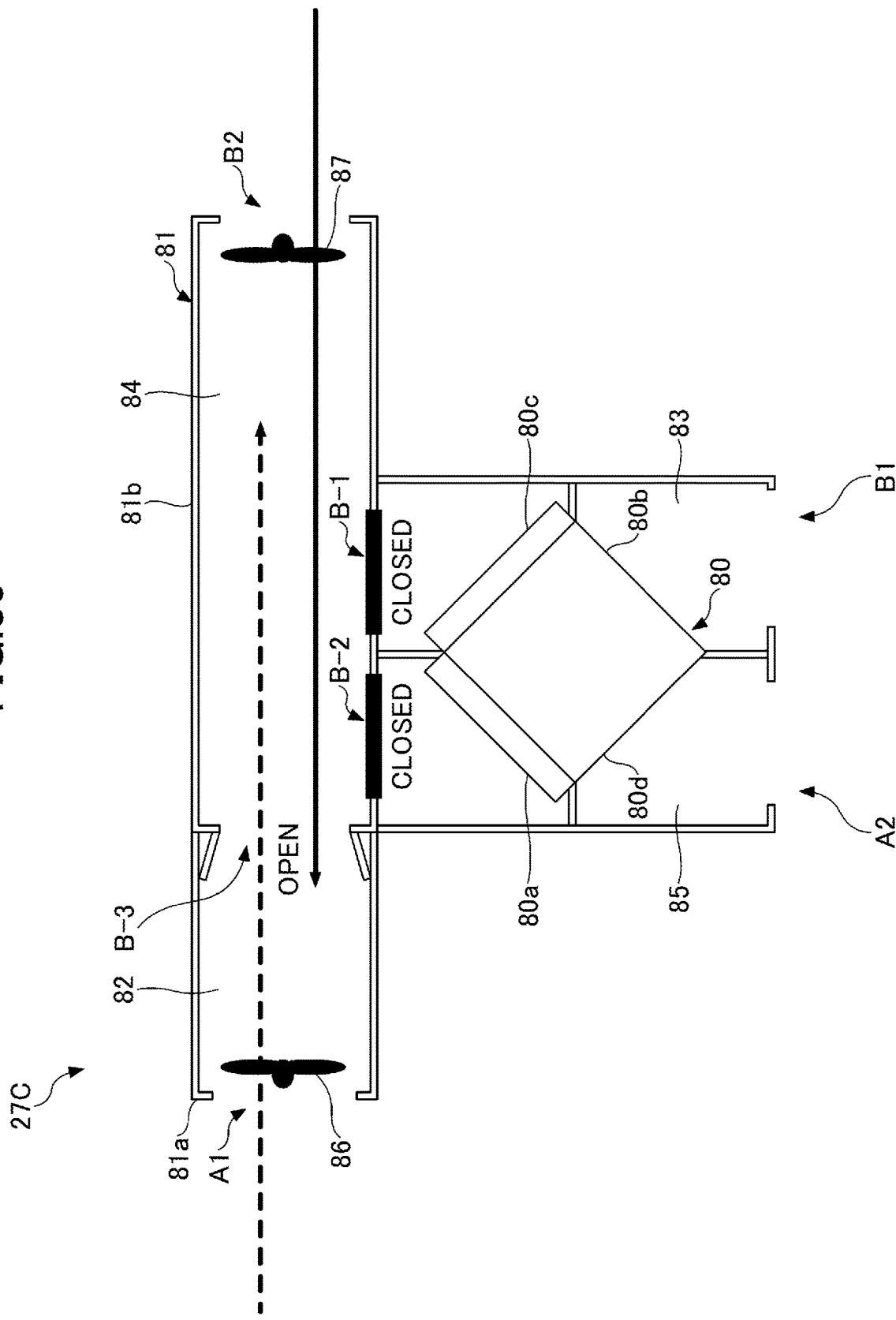
FIG. 39 is a cross-sectional view that shows an example operating state of the temperature adjustment device of the third example structure in the second operating mode, seen from the side.

FIG. 38 is a cross-sectional top view that shows an example operating state of the temperature adjustment device of the third example structure in the second operating mode. FIG. 39 is a cross-sectional view that shows an example operating state of the temperature adjustment device of the third example structure in the second operating mode, seen from the side.

The controller 17 controls the temperature adjustment device 27C in the second operating mode, in which heat is exchanged between the storage chamber 1 and the storage chamber 2, by flowing air therebetween. In the second operating mode of the third example structure, the openings A1 and B2 are used as air suction openings, and the inner chambers 82 and 84 are used as air suction chambers. That is, the air suction and blowout in the second operating mode of the third example structure are the same as in the second operating mode of the first example structure. Consequently, it is possible to exchange heat between the storage chamber 1 and the storage chamber 2 by flowing air therebetween, without making air bypass the heat exchange element 80.

Figure 40:
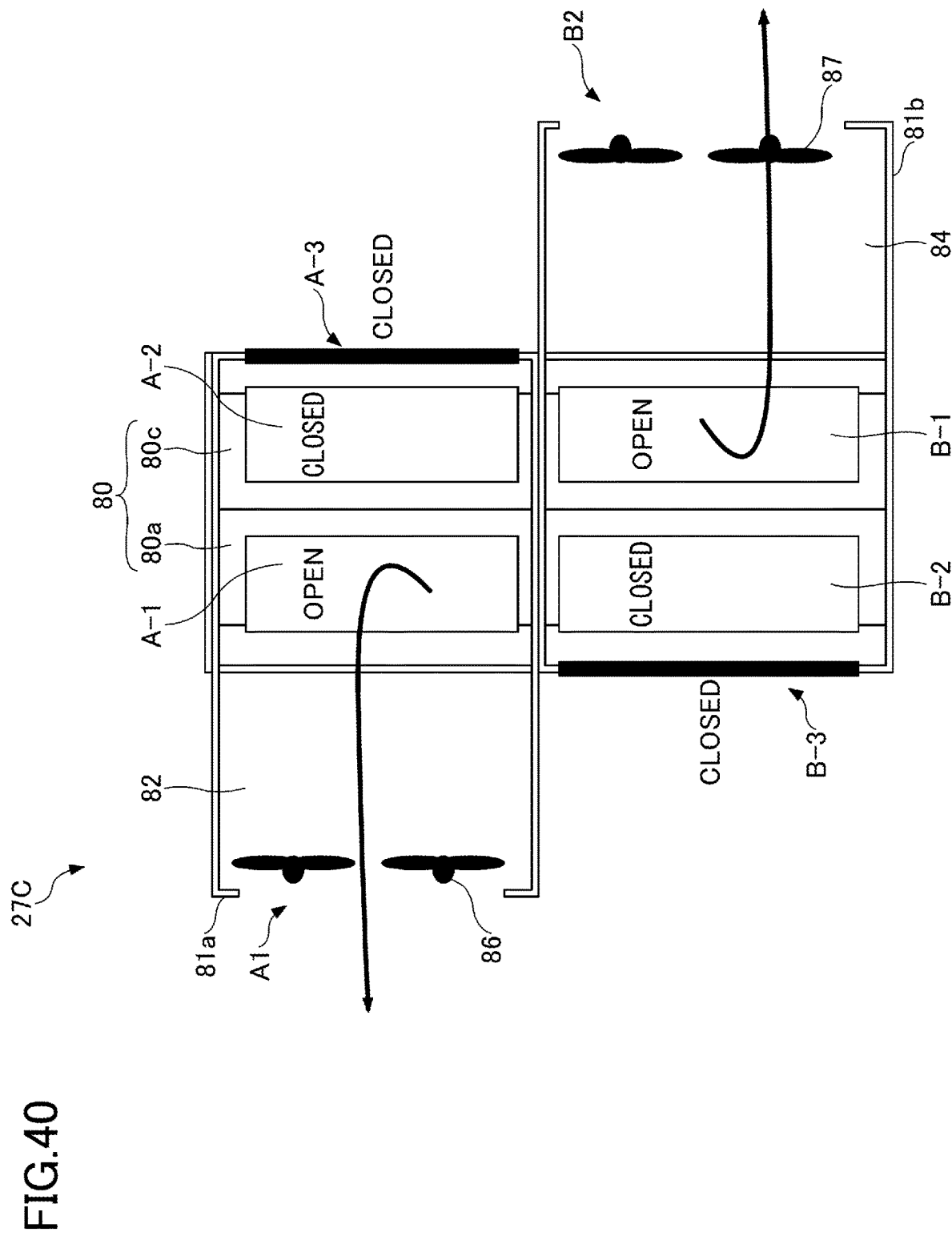
FIG. 40 is a cross-sectional view that shows an example operating state of the temperature adjustment device of the third example structure in a third operating mode, seen from above.
Figure 41:
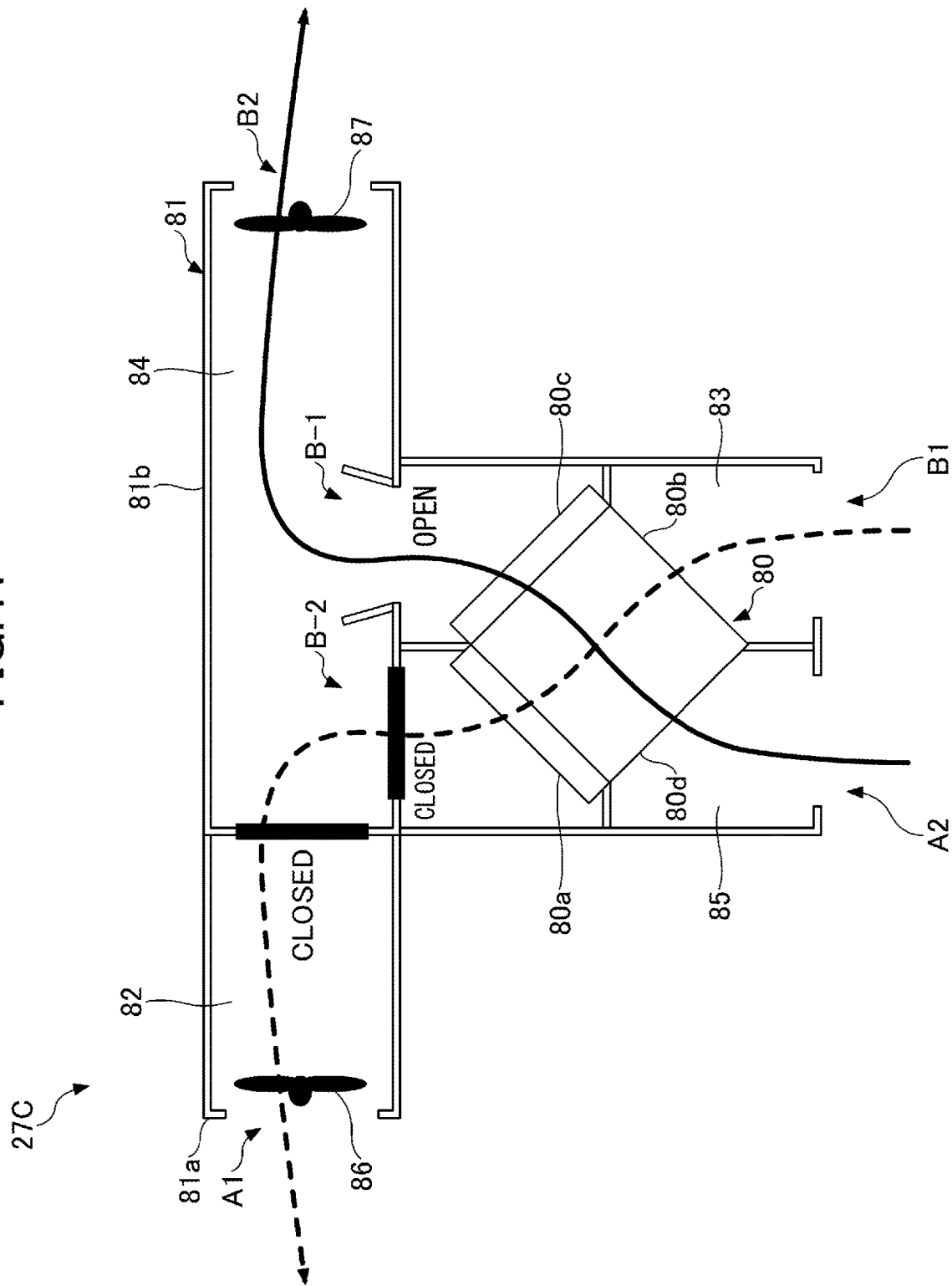
FIG. 41 is a cross-sectional view that shows an example operating state of the temperature adjustment device of the third example structure in the third operating mode, seen from the side.

FIG. 40 is a cross-sectional top view that shows an example operating state of the temperature adjustment device of the third example structure in the third operating mode. FIG. 41 is a cross-sectional view that shows an example operating state of the temperature adjustment device of the third example structure in the third operating mode, seen from the side.

The controller 17 controls the temperature adjustment device 27C in the third operating mode, in which air flows between the storage chamber 1 and the storage chamber 2, while preventing transfer of heat therebetween. In the third operating mode of the third example structure, the openings A1 and B2 are used as blowout openings, the openings A2 and B1 are used as air suction openings, the inner chambers 82 and 84 are used as blowout chambers, and the inner chambers 83 and 85 are used as air suction chambers. That is, the air suction and blowout in the third operating mode of the third example structure are reversed from the third operating mode of the first example structure. Consequently, as illustrated in FIG. 41, air from the storage chamber 1 is supplied to the storage chamber 2 through a reversed route of the route illustrated in FIG. 31 and air from the storage chamber 2 is supplied to the storage chamber 1 through a reversed route of the route illustrated in FIG. 31 Consequently, it is possible to exchange heat between the storage chamber 1 and the storage chamber 2 by flowing air therebetween, without making air bypass the heat exchange element 80.

Figure 42:
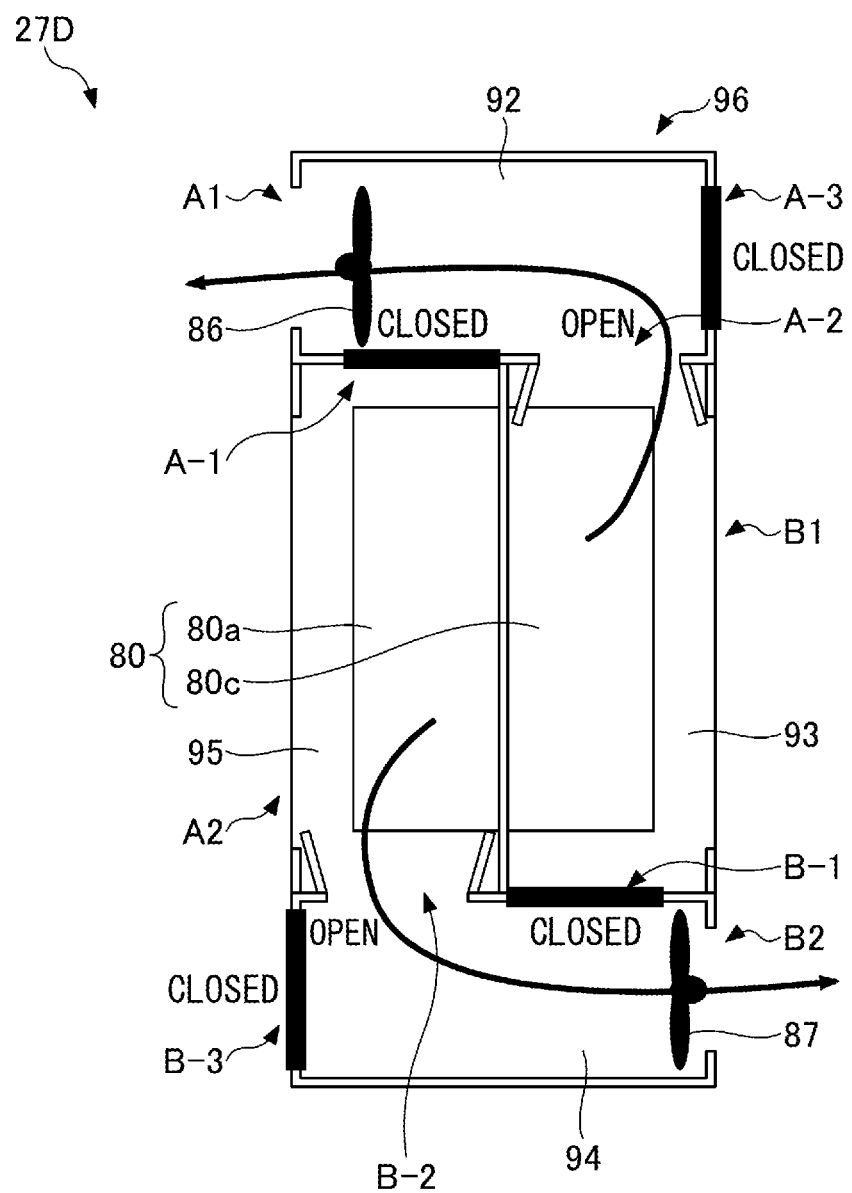
FIG. 42 is a cross-sectional view that shows an example operating state of the temperature adjustment device of a fourth example structure in a first operating mode, seen from above.
Figure 43:
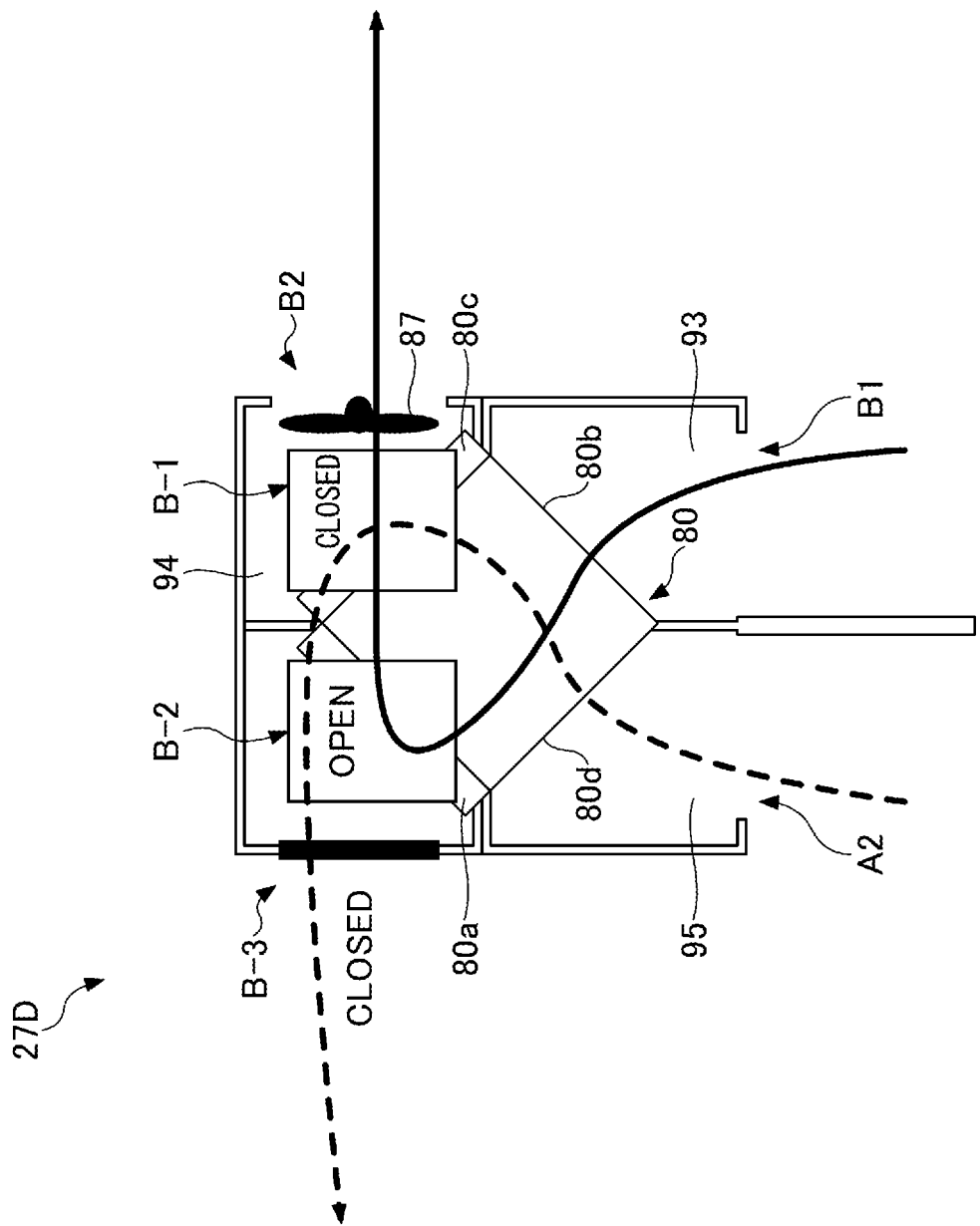
FIG. 43 is a cross-sectional view that shows an example operating state of the temperature adjustment device of the fourth example structure in the first operating mode, seen from the side.

FIG. 42 is a cross-sectional top view that shows an example operating state of the temperature adjustment device of a fourth example structure in the first operating mode. FIG. 43 is a cross-sectional view that shows an example operating state of the temperature adjustment device of the fourth example structure in the first operating mode, seen from the side. The temperature adjustment device 27D illustrated in FIG. 42 and FIG. 43 is a modified example of the temperature adjustment device 27B described above. The temperature adjustment device 27D is structured to suction air from the lower side, and blow out air from the side. Reference should be made to the description given hereinbefore.

The controller 17 controls the temperature adjustment device 27D in the first operating mode, in which heat is exchanged between the storage chamber 1 and the storage chamber 2, without flowing air therebetween. In the first operating mode of the fourth example structure, openings A1 and B2 are used as blowout openings, openings A2 and B1 are used as air suction openings, inner chambers 82 and 84 are used as blowout chambers, and inner chambers 83 and 85 are used as air suction chambers. That is, the air suction and blowout in the first operating mode of the fourth example structure are reversed from the first operating mode of the second example structure. Consequently, as illustrated in FIG. 42 and FIG. 43, air from the storage chamber 1 is returned to the storage chamber 1 through a reversed route of the route illustrated in FIG. 33 and FIG. 34, and air from the storage chamber 2 is returned to the storage chamber 2 through a reversed route of the route illustrated in FIG. 33 and FIG. 34. Consequently, heat is exchanged between the storage chamber 1 and the storage chamber 2 without flowing air therebetween, so that it is possible to prevent dew from forming in the storage chamber 1, which has the lower temperature between the storage chamber 1 and the storage chamber 2.

In this way, like the temperature adjustment devices 27A, 27B, and 27C, the temperature adjustment device 27D can also operate in the first operating mode. Like the temperature adjustment devices 27A, 27B, and 27C, the temperature adjustment device 27D can also operate in the second operating mode and the third operating mode. As to the detailed description of these modes, reference should be made to the description of the temperature adjustment devices 27A, 27B, and 27C given hereinbefore.

Figure 44:
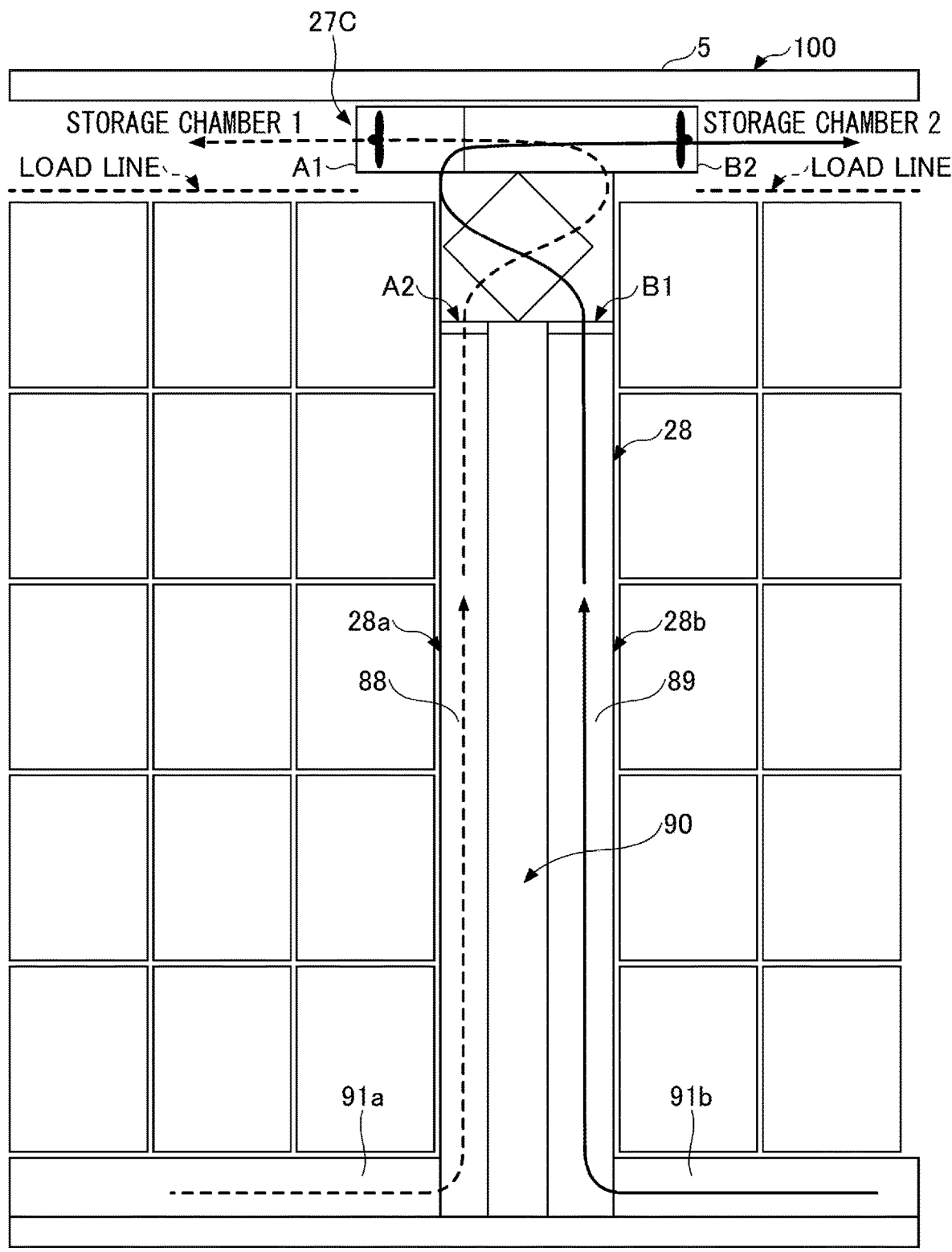
FIG. 44 is a cross-sectional view that shows an example of a vent opening for flowing air from a bottom part of the storage to an upper part of the storage, seen from the side.

FIG. 44 is a cross-sectional view that shows an example of a vent opening for flowing air from the bottom part of the storage to an upper part of the storage, seen from the side. The temperature adjustment device 27C is placed above the partition wall 28. The direction of airflow in the vent paths 88 and 89 in FIG. 44 is different from FIG. 35.

Air blown out of a bottom channel 91a flows into the vent path 88 from the lower end of the vent path 88, and flows out from the upper end of the vent path 88, to the opening A2 of the temperature adjustment device 27C. Air blown out of a bottom channel 91b flows into the vent path 89 from the lower end of the vent path 89, and flows out from the upper end of the vent path 89, to the opening B1 of the temperature adjustment device 27C. The opening A1 is open to the upper space of the storage chamber 1 such that air can be blown into the upper space of the storage chamber 1. The opening B2 is open to the upper space of the storage chamber 2 such that air can be blown into the upper space of the storage chamber 2.

Consequently, as in the case of FIG. 35, the vent paths 88 and 89 can make the air in the bottom part of the storage and the air in the upper part of the storage circulate. By this means, it is possible to prevent the temperature in the storage chamber from varying between the upper part and the lower part.

Although embodiments have been described above, it should be understood that various changes in form and detail may be made without departing from the spirit and scope of the claims attached herewith. Various modifications and improvements such as combination or replacement with part or all of other embodiments are possible.

For example, the temperature adjustment device 27 may directly exchange air between the room 140 and the room 190. The temperature adjustment device 27 may function as a supply vent opening for sending air from the room 190 to the room 140, or function as a return vent opening for returning air from the room 140 to the room 190.

This international application is based on and claims priority to Japanese Patent Application No. 2021-059437, filed on Mar. 31, 2021, and the entire contents of Japanese Patent Application No. 2021-059437 are incorporated herein by reference.

REFERENCE SIGNS LIS 1, 2 storage chamber
5 container
7 openable/closable door
10 freezer
11 casing
12 protruding part
14 partition plate
15 inverter box
16 electrical equipment box
17 controller
18 service door
19 opening
20 compressor
21 heat sink
23 evaporator
25 outer fan
26 partition plate moving device
27, 27A, 27B, 27C, 27D temperature adjustment device
28, 28A, 28B, 28C partition plate
28a, 28b partition surface
29 inner fan
30 storage chamber 32 shelf
33 slide rail
34a horizontal rail
34b vertical rail
35 guiding mechanism
36 bottom rail
40 operating panel
41 storage
42, 46 window
43 automatic carrier device
44 door
45 vent opening
47 traveling path
50 reception device
70 side surface
80 heat-exchange element
81, 96 casing
81a, 81b, 81c casing part
82, 83, 84, 85, 92, 93, 94, 95 inner chamber
86, 87 air blower
88, 89 vent path
90 heat-insulating material
91a, 91b bottom channel
100 storage
100a, 100b gate device
140 room
150, 150a, 150b heat-insulating wall
152, 154, 172 runner
156 gear
158 rack gear
160 accordion slat
170 air-tight member
180 wire
190 room
A1, B2 opening
A2, B1 opening
A-3, B-3 openable/closable window
S inner space
S1 outer storage space
S2 inner storage space
S3 inner air channel

The invention claimed is:

1. A storage unit comprising:
a storage chamber that stores goods;
a partition configured to move back and forth in a direction along an inner wall of the storage chamber, and divide the storage chamber into a plurality of rooms; and
a temperature adjustment device having a casing including multiple casing parts with a plurality of openings on a surface of the casing, the temperature adjustment device being configured to move back and forth in the direction along the inner wall of the storage chamber, and adjust the plurality of rooms to different temperatures,
wherein the temperature adjustment device configured to perform as an air-to-air heat exchanger has a heat exchange element and the casing that houses the heat exchange element and has the plurality of openings and a plurality of openable/closable windows in the casing such that at least one opening of the plurality of openings and at least one openable/closable window of the plurality of openable/closable windows are provided in a pair of opposing surfaces of each casing part of the casing.

2. The storage unit according to claim 1, wherein the temperature adjustment device moves in the direction in conjunction with movement of the partition.

3. The storage unit according to claim 2,
wherein the partition is configured to move back and forth between a first position, at which the partition is stored along the inner wall, and a second position, at which the partition divides the storage chamber into the plurality of rooms, and
wherein the temperature adjustment device moves in the direction in conjunction with the movement of the partition between the first position and the second position.

4. The storage unit according to claim 1,
wherein the partition has a partition surface in which a plurality of slats are connected in an accordion-like manner, and
wherein the partition surface is positioned along the inner wall when the partition is stored along the inner wall, and positioned to face the direction when the partition divides the storage chamber into the plurality of rooms.

5. The storage unit according to claim 1, wherein the temperature adjustment device spans the plurality of rooms when the partition divides the storage chamber into the plurality of rooms.

6. The storage unit according to claim 1, wherein the temperature adjustment device is further configured to move back and forth up to an outer door that separates an inside and an outside of the storage.

7. The storage unit according to claim 1, wherein the multiple casing parts are arranged such that at least one casing part of the multiple casing parts is placed on top of another casing part of the multiple casing parts.

8. The storage unit according to claim 1, wherein the at least one opening and the at least one openable/closable window of one casing part of the multiple casing parts are offset from a head-on position with respect to another casing part of the multiple casing parts.

* * * * *